US009494098B2

(12) United States Patent
Ogata et al.

(10) Patent No.: US 9,494,098 B2
(45) Date of Patent: Nov. 15, 2016

(54) METHOD FOR DETECTING COMBUSTION NOISE IN INTERNAL COMBUSTION ENGINE, COMBUSTION NOISE DETECTION DEVICE, AND DEVICE FOR CONTROLLING INTERNAL COMBUSTION ENGINE

(75) Inventors: Kenichiroh Ogata, Tokyo (JP); Daisuke Watanabe, Hitachinaka (JP); Takashi Okamoto, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 371 days.

(21) Appl. No.: 14/235,271

(22) PCT Filed: Jul. 26, 2012

(86) PCT No.: PCT/JP2012/069002
§ 371 (c)(1),
(2), (4) Date: Jan. 27, 2014

(87) PCT Pub. No.: WO2013/015372
PCT Pub. Date: Jan. 31, 2013

(65) Prior Publication Data
US 2014/0172280 A1 Jun. 19, 2014

(30) Foreign Application Priority Data
Jul. 28, 2011 (JP) .................................. 2011-165667

(51) Int. Cl.
*F02D 35/02* (2006.01)
*F02D 41/00* (2006.01)
(Continued)

(52) U.S. Cl.
CPC .......... *F02D 41/1493* (2013.01); *B60W 10/04* (2013.01); *F02D 13/0242* (2013.01);
(Continued)

(58) Field of Classification Search
CPC .............. F02D 41/1493; F02D 41/3017; F02D 2200/025; F02D 41/0007; F02D
(Continued)

(56) References Cited

U.S. PATENT DOCUMENTS 4,268,910 A * 5/1981 Omori ................... F02P 5/1523
123/406.29
4,617,895 A * 10/1986 Sakakibara ........... F02P 5/1523
123/406.38
(Continued)

FOREIGN PATENT DOCUMENTS

DE 102009056478 * 5/2011 ........... G01L 23/225
JP 62-267546 11/1987
(Continued)

OTHER PUBLICATIONS

PCT International Search Report on application PCT/JP2012/069002 mailed Aug. 28, 2012; 1 page.

*Primary Examiner* — Stephen K Cronin
*Assistant Examiner* — Raza Najmuddin
(74) *Attorney, Agent, or Firm* — Foley & Lardner LLP

(57) ABSTRACT

Although a method for changing a combustion method taking place in an internal combustion engine depending on running condition is proposed, it can be considered that conditions under which a combustion noise occurs naturally differ with different methods. A detection method of prior art is not compatible with different combustion methods and the accuracy of combustion noise detection was low. Accurate combustion noise detection is enabled by identifying a combustion mode taking place in the internal combustion engine, selecting a sensed frequency or frequency band of a combustion noise sensor that detects a combustion noise in a combustion chamber of the internal combustion engine according to the combustion mode, and detecting a combustion noise.

19 Claims, 22 Drawing Sheets

(51) Int. Cl.
*F02D 41/14* (2006.01)
*G01H 17/00* (2006.01)
*F02D 41/30* (2006.01)
*B60W 10/04* (2006.01)
*F02D 41/40* (2006.01)
*F02P 5/04* (2006.01)
*F02D 13/02* (2006.01)
*G01M 15/12* (2006.01)
*F02D 41/28* (2006.01)

(52) U.S. Cl.
CPC ......... *F02D 35/027* (2013.01); *F02D 41/0007* (2013.01); *F02D 41/3017* (2013.01); *F02D 41/40* (2013.01); *F02P 5/04* (2013.01); *G01H 17/00* (2013.01); *F02D 2041/001* (2013.01); *F02D 2041/1432* (2013.01); *F02D 2041/288* (2013.01); *F02D 2200/025* (2013.01); *G01M 15/12* (2013.01); *Y02T 10/128* (2013.01); *Y02T 10/144* (2013.01); *Y02T 10/18* (2013.01); *Y02T 10/44* (2013.01)

(58) Field of Classification Search
CPC ................ 2041/288;F02D 5/04; F02D 35/027; F02D 2041/1432; F02D 41/40; F02D 13/0242; F02D 2041/001; F02D 41/3011; F02D 41/3035; F02D 41/30; F02D 35/023; F02D 35/024; F02D 35/028; G01H 17/00; G01M 15/12; B60W 10/04; Y02T 10/144; Y02T 10/44; Y02T 10/18; Y02T 10/46; G01L 23/225; F02P 5/152; F02P 5/1455; F02P 5/153; F02P 5/1502; F02P 5/1504; F02P 5/1514; F02B 77/085
USPC ................ 701/101, 102, 106, 110, 111, 115; 73/35.01, 35.07, 35.08, 35.09, 35.11, 73/35.12, 35.13, 114.07, 114.16, 114.17, 73/114.18
See application file for complete search history.

(56) References Cited

U.S. PATENT DOCUMENTS

| | | | | |
|---|---|---|---|---|
| 6,371,076 B1* | 4/2002 | Kamijo | ................ | F02D 35/027 123/295 |
| 6,688,286 B2* | 2/2004 | Kokubo | ................ | F02D 35/027 123/406.33 |
| 7,424,820 B2* | 9/2008 | Iwade | ................ | G01L 23/225 123/406.38 |
| 7,533,559 B2* | 5/2009 | Goto | ................ | G01L 23/225 73/35.09 |
| 7,624,619 B2* | 12/2009 | Tanaya | ................ | G01L 23/225 73/35.04 |
| 7,681,552 B2* | 3/2010 | Kaneko | ................ | F02P 5/152 123/406.29 |
| 7,853,400 B2* | 12/2010 | Matsushima | ......... | G01L 23/225 123/406.34 |
| 8,099,231 B1* | 1/2012 | Suwa | ................ | F02D 41/221 123/406.21 |
| 8,109,253 B2* | 2/2012 | Schueler | ................ | G01H 1/06 123/406.38 |
| 2004/0050363 A1* | 3/2004 | Yamaoka | ......... | B60W 30/1819 123/435 |
| 2004/0194754 A1* | 10/2004 | Yamaoka | ............. | B60W 10/06 123/295 |
| 2006/0243030 A1* | 11/2006 | Oe | ................ | G01L 23/225 73/35.09 |
| 2006/0288982 A1* | 12/2006 | Kaneko | ................ | F02D 35/027 123/406.39 |
| 2007/0062488 A1* | 3/2007 | Kobayashi | ............ | F02D 35/027 123/406.16 |
| 2008/0091335 A1* | 4/2008 | Takemura | ............. | G01L 23/225 701/111 |
| 2008/0257025 A1* | 10/2008 | Miyaji | ................ | G01M 15/12 73/114.07 |
| 2009/0158816 A1* | 6/2009 | Kaneko | ................ | F02D 35/027 73/35.09 |
| 2009/0223281 A1 | 9/2009 | Masuda et al. | | |
| 2009/0312931 A1* | 12/2009 | Wang | ................ | F02D 35/023 701/102 |
| 2010/0063711 A1* | 3/2010 | Hagel | ................ | F02D 41/0087 701/111 |
| 2010/0132443 A1* | 6/2010 | Kim | ................ | F02D 35/028 73/114.63 |
| 2011/0093186 A1* | 4/2011 | Hagari | ................ | F02D 13/0226 701/111 |
| 2011/0146384 A1* | 6/2011 | Kaneko | ................ | G01L 23/225 73/35.09 |
| 2011/0246049 A1* | 10/2011 | Matsuo | ................ | F02D 35/02 701/111 |
| 2011/0307163 A1* | 12/2011 | Kato | ................ | F02D 13/0265 701/104 |

FOREIGN PATENT DOCUMENTS

| | | |
|---|---|---|
| JP | 2009-209828 A | 9/2009 |
| JP | 2009228655 A * | 10/2009 |
| JP | 2010-196497 A | 9/2010 |
| JP | 2010-216264 A | 9/2010 |
| JP | 4602420 B2 * | 12/2010 |
| JP | 5104453 B2 * | 12/2012 |

* cited by examiner

METHOD FOR DETECTING COMBUSTION NOISE IN INTERNAL COMBUSTION ENGINE, COMBUSTION NOISE DETECTION DEVICE, AND DEVICE FOR CONTROLLING INTERNAL COMBUSTION ENGINE

TECHNICAL FIELD

The present invention relates to a method and device for detecting combustion noise to detect a combustion noise in an internal combustion engine and a device for controlling the internal combustion engine by driving a regulatory mechanism for controlling combustion in the internal combustion engine. In particular, the invention relates to a method and device for detecting combustion noise that directly or indirectly identify a condition of combustion which may take place by one of different combustion methods in a combustion chamber of the internal combustion engine and a device for controlling the internal combustion engine that controls combustion through the use of the device for detecting combustion noise so as to improve fuel efficiency performance or/and emission performance of the internal combustion engine.

BACKGROUND ART

It is known that a vibration sensing type knock sensor that senses vibration of the internal combustion engine is used as a means for identifying a combustion condition in the combustion chamber of the internal combustion engine. Although this knock sensor is intended to sense vibration of the internal combustion engine, it indirectly senses a combustion condition in the combustion chamber and senses that the internal combustion engine vibrates with an excessive increase of the pressure in the combustion chamber, typically because combustion condition changes.

Stated differently, it is thought that the pressure of shock waves resulting from combustion gas in the combustion chamber is transmitted through a cylinder head and pistons. Because the rigidity of the combustion chamber walls of the cylinder head is generally higher than that of the pistons and related parts, most of vibration energy that is transmitted flows from the pistons to the cylinder block. This vibration energy is sensed by a knock sensor which is a vibration sensor. Thus, this vibration represents a fluctuation in combustion condition and, therefore, can be regarded as a combustion noise.

A technique that identifies or detects the occurrence of such a combustion noise and controls combustion so as to suppress the combustion noise is disclosed in Japanese Unexamined Patent Application Publication No. 2010-216264 (Patent Literature 1).

In a flowchart (see FIG. 10) disclosed in Patent Literature 1, based on a combustion temperature which has been read in at S1, an integrated value of knock sensor signals corresponding to frequencies 8 kHz and 6 kHz is detected at S2 and S3. At S4 and S12, a combustion period is determined using the integrated value of the know sensor signals. At subsequent S5, S7, S13, and S17, a determination of ignition timing is made. Further, at S9, it is determined whether an engine misfire occurs and, at S14, a determination is made as to whether a target rail pressure is satisfied. Based on the combustion period and ignition timing thus determined, the fuel injection quantity (PreQ), the amount of exhaust gas recirculation (EGR), and fuel injection timing (IT) are controlled and the routine is terminated.

In the cited literature 1, there is the following description: it is possible to detect a combustion period and ignition timing accurately by selecting frequencies of sensed signals for calculating the combustion period and ignition timing and, thereby, combustion condition can be feedback controlled to a predetermined condition.

CITATION LIST

Patent Literature

[Patent Literature 1] Japanese Unexamined Patent Application Publication No. 2010-216264

SUMMARY OF INVENTION

Technical Problem

By the way, there are demands on future internal combustion engines, such as an improvement of fuel efficiency performance and an improvement of emission performance; moreover, a synergistic improvement of both performances. As an approach to this end, diverse technical improvements are proposed. As one of the techniques proposed, such a method draws attention that changes over the combustion method of the internal combustion engine according to running condition of a vehicle such as an automobile and running condition of the internal combustion engine itself.

For instance, it is proposed to, depending on running condition, selectively perform either of the following combustion methods: one method in which air-fuel mixture (a gaseous state in which fuel and air are mixed) near to a theoretical air-fuel ratio (stoichiometric ratio) or a lean mixture in which the proportion of air is larger than the theoretical air-fuel ratio is ignited by an ignition plug; and another method in which air-fuel mixture is ignited by heat generated by adiabatic compression of the mixture without relying on the ignition plug.

However, it can be considered that conditions under which a combustion noise occurs naturally differ with such different combustion methods. It is foreseeable that the forgoing detection method of prior art may not be compatible with different combustion methods. That is, the foregoing method of prior art selectively uses frequencies of vibration occurring with respect to one combustion method (which is classified with compression ignited combustion for a diesel engine in this example) and calculates ignition timing and a combustion period accurately, thereby improving the combustion condition, but this method does not take different combustion methods into consideration.

With regard to a control device that is used for an internal combustion engine that applies different combustion methods depending on running condition of a vehicle such as an automobile and running condition of the internal combustion engine itself, an object of the present invention is to provide a device for controlling the internal combustion engine that directly or indirectly identifies, as a combustion noise, a combustion condition in the combustion chamber of the internal combustion engine performing one of the different combustion methods and drives a regulatory mechanism for controlling combustion in the internal combustion engine so as to improve fuel efficiency performance or/and emission performance of the internal combustion engine, based on the combustion noise.

Solution to Problem

A feature of the present invention resides in identifying a combustion mode of an internal combustion engine that is driven by a combustion method (hereinafter referred to as a combustion mode) which is set depending on running condition, selecting a sensed frequency or frequency band of a combustion noise sensor that senses a combustion noise in a combustion chamber of the internal combustion engine according to the combustion mode, and detecting a comparative magnitude of the combustion noise.

Another feature of the present invention resides in driving a regulatory mechanism for controlling combustion in the internal combustion engine so that the combustion noise in the combustion chamber of the internal combustion engine is reduced to a predetermined level of combustion noise through the use of a result of combustion noise detection as described above.

Combustion modes assumed in this context are typically spark ignited combustion and compression ignited combustion. As will be mentioned with regard to embodiments in the "Description of Embodiments" section to be described later, the technical idea of the present invention can be applied in diverse combustion modes not limited to these modes.

As combustion noise sensors, a vibration sensor which senses a fluctuation in pressure caused by combustion gas in terms of vibration, an ion current sensor which measures electrical conductance of combustion gas in the combustion chamber, an intra-cylinder pressure sensor that measures combustion pressure in the combustion chamber, and so on can be used. As for signals sensed by these sensors, the behavior of frequency distribution regarding combustion noise exhibits the same tendency for different combustion modes.

With the finding that there is a distinct sensed frequency or frequency band that is identifiable (or having a conspicuous value), specific to each combustion mode, the present invention principally suggests that a combustion noise occurrence can be detected with accuracy by selectively detecting such a frequency or frequency band according to each combustion mode. By controlling combustion condition in the combustion chamber using this detection method, rigorous control can be conducted and, in consequence, it can be expected to improve fuel efficiency performance and emission performance.

The regulatory mechanism for regulating combustion condition includes components for regulating the open/close timing and open/close lift of an intake valve and an exhaust valve of the internal combustion engine, regulating the fuel injection timing and period (corresponding to injection quantity) of an injector valve, delaying and advancing the ignition timing of an ignition plug, increasing or decreasing the supercharging pressure by a turbocharger, increasing or decreasing the drive torque or generator torque of a vehicle driving motor in a hybrid car or the like, etc. Not limited to these components, the regulatory mechanism may include any component that can regulate combustion condition of the internal combustion engine.

Advantageous Effects of Invention

According to the present invention, it is possible to detect combustion condition with high accuracy by appropriately selecting a sensed frequency or frequency band of a combustion noise sensor according to a combustion mode. Consequently, the combustion condition of the internal combustion engine can be controlled accurately so that an actual combustion noise which is detected with the sensed frequency or frequency band thus selected becomes less than a predetermined level of combustion noise. Thus, such an effect can be expected that the fuel efficiency performance or/and emission performance of the internal combustion engine can be improved.

BRIEF DESCRIPTION OF DRAWINGS

FIG. 11 is a block diagram of a sensed frequency computing unit when the compression ignited combustion FLG is ON.

FIG. 14 is a system block diagram of a control section for suppressing combustion noise when the compression ignited combustion FLG is ON.

FIG. 15 is a characteristic diagram regarding exhaust valve control when the compression ignited combustion FLG is ON.

FIG. 16 is a characteristic diagram regarding injection period control when the compression ignited combustion FLG is ON.

FIG. 17 is a characteristic diagram regarding supercharging pressure control when the compression ignited combustion FLG is ON.

FIG. 18 is a characteristic diagram regarding control of drive torque and generator torque of a motor when the compression ignited combustion FLG is ON.

DESCRIPTION OF EMBODIMENTS

Figure 1:
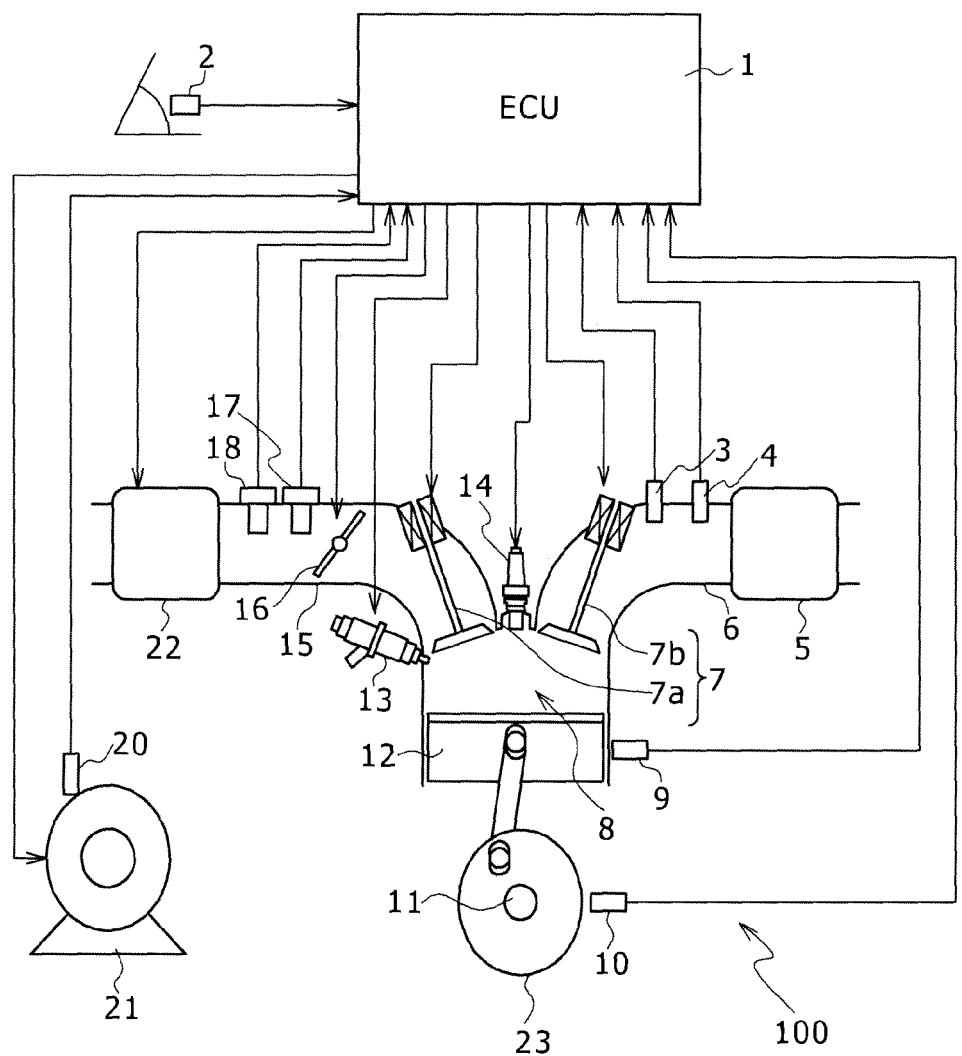
FIG. 1 is a structural diagram depicting a structure of a device for controlling an internal combustion engine, as one embodiment of the present invention.

In the following, embodiments of the present invention will be described in detail according to the drawings. In the embodiments, a device for controlling an internal combustion engine equipped with a vibration sensing type knock sensor as a combustion noise sensor is basically described.
First Embodiment A structure of a device for controlling an internal combustion engine according to a first embodiment is described using FIG. 1. The device structure of this embodiment is assumed to be applied to a gasoline internal combustion engine for automobiles.

The internal combustion engine 100 is the gasoline internal combustion engine for automobiles that performs different combustion modes: (1) spark ignited combustion and (2) compression ignited combustion. Both combustion modes use an air-fuel mixture having the same air-fuel ratio.

Here, (1) spark ignited combustion is a method in which the air-fuel mixture fed into the internal combustion engine is ignited by an ignition plug mounted to a cylinder head and combusted and (2) compression ignited combustion is a method in which air fed into a combustion chamber is adiabatically compressed by a piston to increase its temperature and fuel is injected into this air, thus causing self-ignition and fuel combustion or a method in which the air-fuel mixture fed into the internal combustion engine is adiabatically compressed by a piston to increase its temperature, thus causing self-ignition and fuel combustion.

An intake pipe 15 forming an induction system of the internal combustion engine is provided with an air flow sensor 18 for measuring an intake air volume, an electronically controlled throttle device 16 for adjusting pressure inside the intake pipe, an intake air temperature sensor 17 for measuring the temperature of intake air, which is a form of an intake air temperature detector, and a supercharger 22 like a turbocharger for compressing intake air to improve charging efficiency in suitable positions. In some cases, the structure may not include the supercharger 22 and an intake air pressure sensor may be provided instead of the air flow sensor 18.

The internal combustion engine 100 has a cylinder in which a piston 12 is housed and a fuel injector (hereinafter referred to as an injector valve) 13 which directly injects fuel into a combustion chamber 8 of the cylinder and an ignition plug 14 which provides ignition energy are provided on each cylinder. An injector valve 13 may be provided in a suitable position on the intake pipe 15 instead of the injector valve 13 which injects fuel into the combustion chamber 8 of the cylinder. This is so-called multi-point injection (MPI).

In order to directly or indirectly identify (including a concept of sensing) a combustion condition in the internal combustion engine, a vibration sensing type knock sensor 9 which measures the mechanical vibration of the internal combustion engine is provided in a suitable position (typically on the cylinder block) in the internal combustion engine 100. This knock sensor 9 is a non-resonant knock sensor and capable of sensing vibration over a wide frequency band.

Moreover, valve regulating devices 7 which are formed of an intake valve regulating device 7a for adjusting intake air flowing into the combustion chamber 8 of the internal combustion engine and an exhaust vale regulating device 7b for adjusting exhaust gas flowing out of the combustion chamber 8 are provided in respective suitable positions in the internal combustion engine 100.

By adjusting the valve regulating devices 7, it is possible to change the open/close timing (phase angle) and the lift stroke (working angle) of an intake value and an exhaust valve and it is possible to adjust the true amount of air flowing into the combustion chamber 8 and the internal EGR amount depending on valve overlap.

Furthermore, a fuel pump 21 which is a form of a pressure adjuster and supplies fuel to the injector valve 13 is provided in a suitable position in the internal combustion engine 100. The fuel pump 21 is provided with a fuel pressure sensor 20 which is a form of a fuel pressure detector and measures the pressure of fuel.

An exhaust pipe 6 forming an exhaust system is provided with a three-way catalyst 5 which decontaminates exhaust air, an air-fuel ratio sensor 4 which is a form of an air-fuel ratio detector and detects the air-fuel ratio of exhaust air upstream of the three-way catalyst 5, and an exhaust air temperature sensor 3 which is a form of an exhaust air temperature detector and measures the temperature of exhaust air upstream of the three-way catalyst 5 in suitable positions.

Also, a crankshaft 11 is provided with a crank angle sensor 10 for detecting, inter alia, the angle and angular velocity of the crankshaft 11 and the moving speed of the piston 12.

Furthermore, a vehicle driving motor 23 is provided in a suitable position such that it can transmit motive power to the crankshaft 11; however, the structure may not include the vehicle driving motor 23. The vehicle driving motor 23 is, for example, a motor for use in a hybrid car and is capable of driving the car in a state when the internal combustion engine 100 stops or when the engine is running. The vehicle driving motor 23 also acts as a regenerative brake while the car is decelerating and can work as a generator to charge a lithium battery mounted in the car.

Sensed signals obtained from the air flow sensor 18, intake air temperature sensor 17, knock sensor 9, fuel pressure sensor 20, air-fuel ratio sensor 4, and exhaust air temperature sensor 3 are sent to an internal combustion engine control unit (hereinafter referred to as ECU) 1. A signal obtained from an accelerator position sensor 2, the signal representing a driving intention of the driver, is also sent to the ECU 1. The accelerator position sensor 2 detects the amount of actuation of an accelerator pedal, in other words, the accelerator position which corresponds to torque required by the driver.

Based on signals output by the accelerator position sensor 2, the ECU 1 computes required torque, and the accelerator position sensor 2 is used as a required torque detecting sensor which detects required torque for the internal combustion engine 100.

Based on signals output by the crank angle sensor 10, the ECU 1 also computes the angle and angular velocity of the crankshaft 1, the moving speed of the piston 12, and the revolving speed of the internal combustion engine in accordance with predefined calculation formulae.

Based on the running condition of the internal combustion engine 100, which is derived from the outputs of the above-mentioned various sensors, the ECU 1 computes operating parameters required for controlling the internal combustion engine 100, such as the degree of opening of the electronically controlled throttle device 16, the fuel injection period and timing of the injector valve 13, ignition timing of the ignition plug 14, and valve open/close timing of the intake valve regulating device 7a and the exhaust valve regulating device 7b. Note that the ECU 1 computes other operating parameters than these operating parameters and controls the operation of the internal combustion engine.

Then, the fuel injection period computed by the ECU 1 is converted to a valve opening pulse signal and this signal is sent to the injector valve 13. The similarly computed ignition timing is converted to an ignition signal and this signal is sent to the ignition plug 13. The similarly computed degree of opening of the throttle is converted to a throttle driving signal and this signal is sent to the electronically controlled throttle device 16. The similarly computed valve open/close timing is converted to a variable valve driving signal and this signal is sent to the valve regulating devices 7.

Besides, a similarly computed operating parameter for the fuel pump 21 is converted to a fuel pump driving signal and this signal is sent to the fuel pump 21. A similarly computed operating parameter for the supercharger 22 is converted to a supercharger driving signal and this signal is sent to the supercharger 22. A similarly computed operating parameter for the vehicle driving motor 23 is converted to a motor command signal and this signal is sent to the vehicle driving motor 23.

Here, while the electronically controlled throttle device 16, injector valve 13, ignition plug 14, intake valve regulating device 7a, exhaust valve regulating device 7b, fuel pump 21, supercharger 22, and vehicle driving motor 23 control the operating parameters required for the operation of the internal combustion engine, they essentially have functions as the regulatory mechanism for controlling or regulating the combustion condition of the internal combustion engine. It goes without saying that other components of the regulatory mechanism than the above ones may, of course, be adopted.

Therefore, through the operations of the foregoing sensors that identify or detect diverse operating parameters of the internal combustion engine and the regulatory mechanism that regulates the diverse operating parameters of the internal combustion engine, fuel is injected in air that flowed into combustion chamber 8 via the intake valve from the intake pipe 15, thus producing an air-fuel mixture inside the combustion chamber 8, the air-fuel mixture is ignited to explode and combust by sparks generated by the ignition plug 13 at predetermined ignition timing, and the combustion pressure pushes the piston 12 down, which produces the force of driving the internal combustion engine 100. Furthermore, exhaust air after explosion is transferred through the exhaust pipe 6 to the three-way catalyst 5, decontaminated inside the three-way catalyst 5, and emitted into atmosphere.

Figure 2:
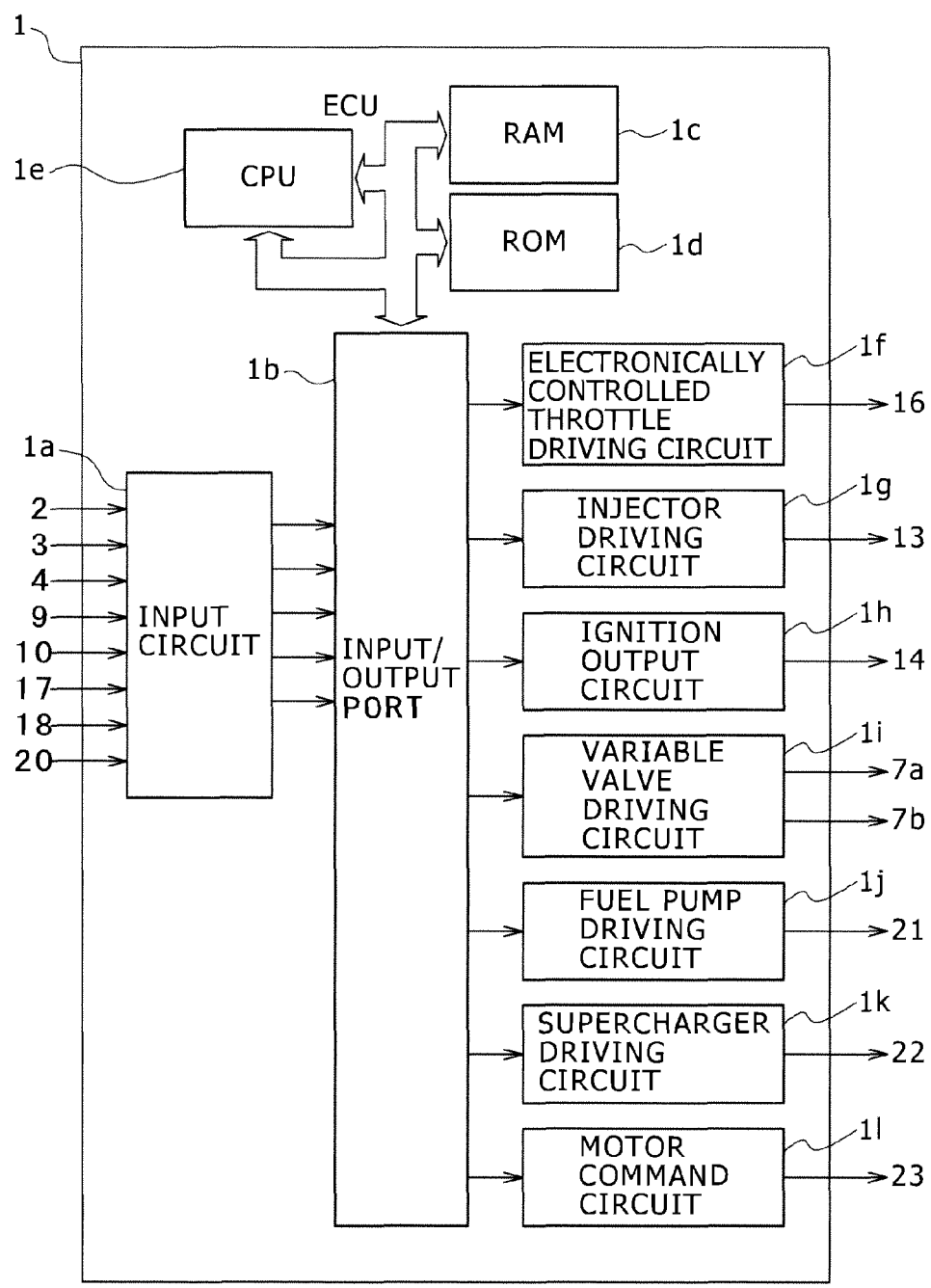
FIG. 2 is a block diagram depicting an internal structure of an ECU depicted in FIG. 1.

Then, using FIG. 2, descriptions are provided about the structure of the device for controlling the internal combustion engine. This structure is fundamentally comprised of, inter alia, logic elements, operational elements, and storage elements of LSI or the like mounted on a control board.

Sensor output signals that represent the operating parameters from, inter alia, the accelerator position sensor 2, exhaust air temperature sensor 3, air-fuel ratio sensor 4, knock sensor 9, crank angle sensor 10, intake air temperature sensor 17, air flow sensor 18, and fuel pressure sensor 20 are input to an input circuit 1a of the ECU 1. Although already noted, the mentioned sensors are representative and signals from other sensors that detect operating parameters of the internal combustion engine than those mentioned may be input without problem.

Input signals from the sensors are transferred from the input circuit 1a to an input port within an input/output port 1b and values transferred to the input port 1b are stored into a RAM 1c and used in computational processing by a CPU 1e.

A control program that described computational processing details is written in advance into a ROM 1d and values presenting the operating parameters of the respective components of the regulatory mechanism, which have been computed according to the control program, are stored into the RAM 1c and then sent to the regulatory mechanism components through their respective driving circuits.

In the case of the present embodiment, there are an electronically controlled throttle driving circuit 1f, a injector valve driving circuit 1g, an ignition output circuit 1h, a variable valve driving circuit 1i, a fuel pump driving circuit 1j, and a supercharger driving circuit 1k as regulatory mechanism driving circuits and a motor command circuit 1l is provided as a command circuit.

The respective driving circuits send control signals to the electronically controlled throttle device 16, injector valve 13, ignition plug 14, valve regulating devices 7, fuel pump 21, supercharger 22, and motor 23, respectively. Although all the foregoing driving circuits are provided within the ECU 1 in the present embodiment, the present embodiment is not so limited. If there is provided a so-called electromechanical integral regulatory mechanism in which driving circuits are installed directly in the regulator mechanism components, it is not needed to provide the driving circuits within the ECU 1.

Figure 3:
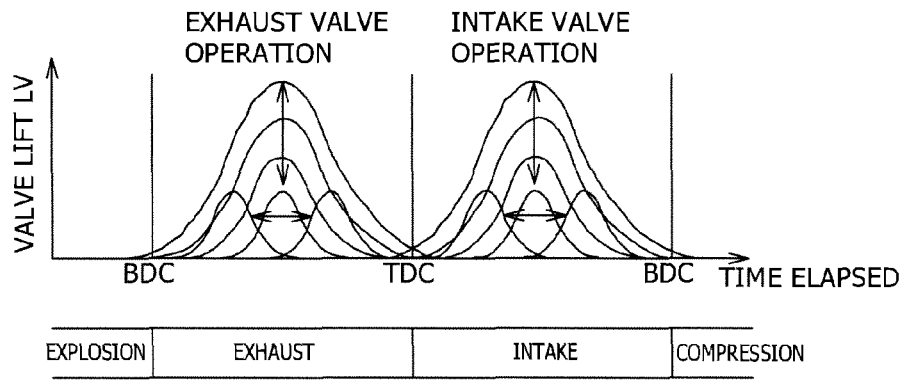
FIG. 3 is a characteristic diagram representing the characteristics of valve regulating devices depicted in FIG. 1.

Then the operating characteristics of the valve regulating devices 7 are described using FIG. 3, in which the ordinate of the graph plots valve lift amount Lv and the abscissa plots phase angle.

BDC denotes when the piston 12 is at a bottom dead center and TDC denotes when the piston 12 is at a top dead center. Also shown are operating strokes (explosion, exhaust, intake, compression) of the internal combustion engine 100 relative to phase angles over time.

The exhaust valve operation takes place from in the vicinity of the end of an explosion stroke, over an exhaust stroke, and up to in the vicinity of the start of an intake stroke. Timing at which the exhaust valve starts to open, as the valve lift amount increases, is defined as exhaust valve open timing (hereinafter referred to as EVO). Subsequently, timing at which the exhaust valve closes, as the valve lift amount decreases, is defined as exhaust valve close timing (hereinafter referred to as EVC).

In the present embodiment, the intake valve and the exhaust valve are provided with the valve regulating devices 7a, 7b. By the operation of these valve regulating devices 7, a continuous or stepwise change is made to the profile of the valve lift amount (e.g., maximum valve lift amount, timing of maximum valve lift amount, valve lift amount change, EVO, EVC, phase, etc.). Similarly, a change can be made to the operation of the intake valve as well.

In the present embodiment, the intake valve and the exhaust valve are provided with the valve regulating devices that make a continuous or stepwise change to the profile of the valve lift amount; but, this is non-liming and only the exhaust valve may be provided with its regulating device. Furthermore, either a valve phase modifying device that modifies a relative phase of a cam shaft to the crankshaft or a valve lift amount regulating mechanism may be provided.

By controlling the valve regulating devices 7 described above and the electronically controlled throttle device 16 mentioned previously, it is possible to adjust the air volume and the internal EGR amount inside the combustion chamber 8.

Figure 4:
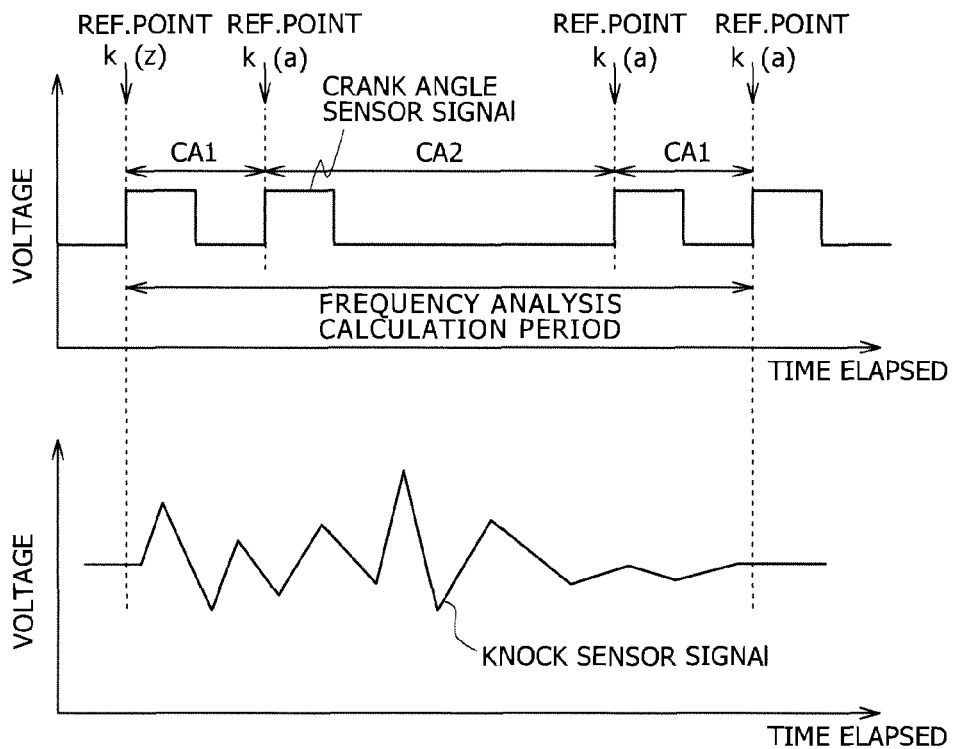
FIG. 4 is a chart diagram representing a period of detection based on output signals of a crank angle sensor depicted in FIG. 1 and a period for which vibration of a knock sensor is judged according to the detection period.

Then, using FIG. 4, descriptions are provided about the output signals of the knock sensor 9 and the crank angle sensor 10 and a period of judgment of vibration (i.e., combustion noise) of the internal combustion engine 100 based on the output signals.

In the present embodiment, an output signal of the crank angle sensor 10 is a rectangular pulse of voltage. A pulse rise with the voltage rising is defined as a rise and a pulse fall with the voltage falling is defined as a fall. A given number z of pulses for one cycle will be output repeatedly. Within the ECU 1, a reference point k (a) is determined at the rise timing of each pulse. Suffix (a) denotes a reference point k number; e.g., reference point k (a)=(1) denotes a reference point determined at the rise of a first pulse after a predetermined period elapsed after the output of the z-th pulse of the given number z of pulses. The last one of the given number z of pulses is denoted as (a)=(z).

A rotation angle of the crankshaft sensed for a period elapsed between reference points k (1) and k (2) is denoted as rotation angle CA2 of the crankshaft. A rotation angle of the crankshaft sensed for a period until each next reference point k (a) determined, other than the above period, is denoted as rotation angle CA1 of the crankshaft. Within the ECU 1, a determination is made of the angle of the crankshaft 11 from the rotation angles CA1, CA2 of the crankshaft. Shortage or excess of the above given number z of pulses indicates that the crank angle sensor is faulty.

A period after a reference point k (z) was determined within the ECU 1 until a given reference point k (a) is determined is fixed as a frequency analysis calculation period for a knock sensor signal. Preferably, the reference point k (z) is set at timing (phase) when the piston 12 is at the top dead center of compression and the given reference point k (a) is set at timing (phase) when the crankshaft 11 has rotated by 60 degrees from the top dead center of compression. Because it is known that knocking typically occurs in this angle range of 60 degrees, it will be expedient to get signals of the knock sensor 9 over this range and perform frequency analysis on the signals by a computer. Vibration sensed for the frequency analysis calculation period is subjected to frequency analysis and a frequency output with peaks at certain center frequencies is obtained. For a spark ignited combustion engine, a frequency output with five distinct peaks at center frequencies is generally obtained.

Figure 5:
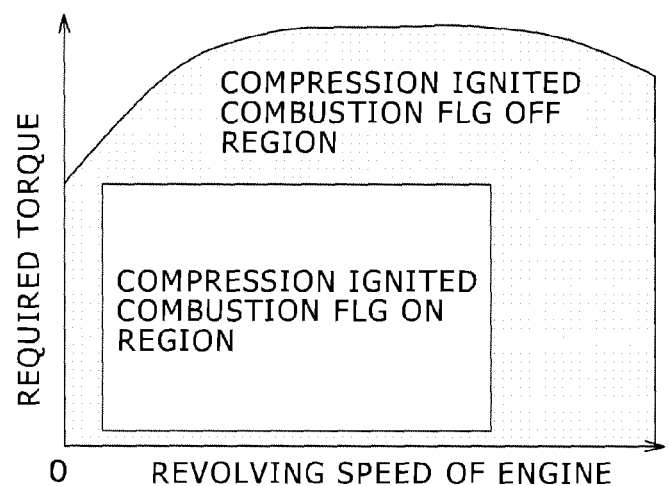
FIG. 5 is a diagram of a control map representing the operating regions of spark ignited combustion and compression ignited combustion, in which the control map is provided in the control device depicted in FIG. 1.

FIG. 5 is a diagram explaining a control map for switching between spark ignited combustion and compression ignited combustion according to their operating regions. In the present embodiment, switching between spark ignited combustion and compression ignited combustion is performed according to their operating regions that are determined by required torque and revolutions per unit time of the internal combustion engine.

The ECU 1 is provided with a switching control map stored in a certain area of a storage element, based on required torque computed from the output signals of the accelerator position sensor 2 and the revolving speed of the internal combustion engine 100 computed from the output signals of the crank angle sensor 10, and switches between ON and OFF of a compression ignited combustion FLG (which stands for flag) depending on the required torque and the revolving speed. That is, when the compression ignited combustion FLG is ON, compression ignited combustion is performed; when the compression ignited combustion FLG is OFF, spark ignited combustion is performed. One feature of the present invention is to select a sensed frequency or frequency band of combustion noise depending on combustion mode which is either spark ignited combustion or compression ignited combustion, as above.

Here, accelerator position and revolutions per unit time are used as parameters for the control map presented in FIG. 5. By using these two parameters, conversion to the air volume that is fed into the combustion chamber 8 is possible. However, switching between spark ignited combustion and compression ignited combustion may be based on only the accelerator position parameter. Provision of the control map for controlling the compression ignited combustion FLG is non-limiting. The ECU may be provided with a control map that is computed from either required torque or internal combustion engine revolving speed.

Then, using FIGS. 6 through 10, descriptions are provided about control for suppressing combustion noise when the compression ignited combustion FLG is off, that is, during spark ignited combustion.

Figure 6:
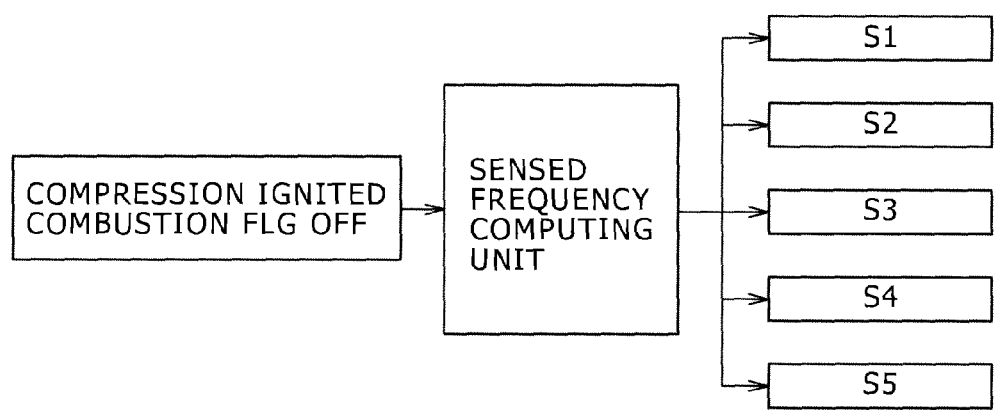
FIG. 6 is a block diagram of a sensed frequency computing unit when a compression ignited combustion FLG is OFF in the control device depicted in FIG. 1.

FIG. 6 is a block diagram of a sensed frequency computing unit when the compression ignited combustion FLG is OFF. Here is provided the sensed frequency computing unit that computes vibration energy in five sensed frequency bands including certain center frequencies $S1, S2, S3, S4, S5$, respectively, among the sensed frequencies of the knock sensor 9 under the condition that the compression ignited combustion FLG is OFF. The sensed frequency computing unit preferably outputs vibration energy in the five sensed frequency bands including the center frequencies $S1, S2, S3, S4, S5$, respectively during spark ignited combustion, when the compression ignited combustion FLG is OFF. Here, distinct center frequencies are as follows: S1≈6 KHz, S2≈10 KHz, S3≈13 KHz, S4≈14 KHz, and S5≈18 KHz.

The frequencies of these five components can be extracted by (1) selecting a frequency band including all the five components or (2) selecting five frequency bands (narrower than the above frequency band), each frequency band including each of the center frequencies of the five components. A more suitable one of these ways may be adopted according to a control system configuration.

The sensed frequency computing unit is configured to be able to perform high-speed computation using a digital signal processor (commonly called DSP) or the like. Frequency analysis can be performed using a method such as Fast Fourier Transform (FFT).

It is preferable that the computing unit outputs at least two of the five sensed frequency bands including the center frequencies S1, S2, S3, S4, S5, respectively, when the compression ignited combustion FLG is OFF. This is because vibration signals significantly appear at the five center frequencies during spark ignited combustion and analyzing two or more components of the center frequencies enables an improvement in the accuracy of detecting vibration caused by combustion noise.

Figure 7:
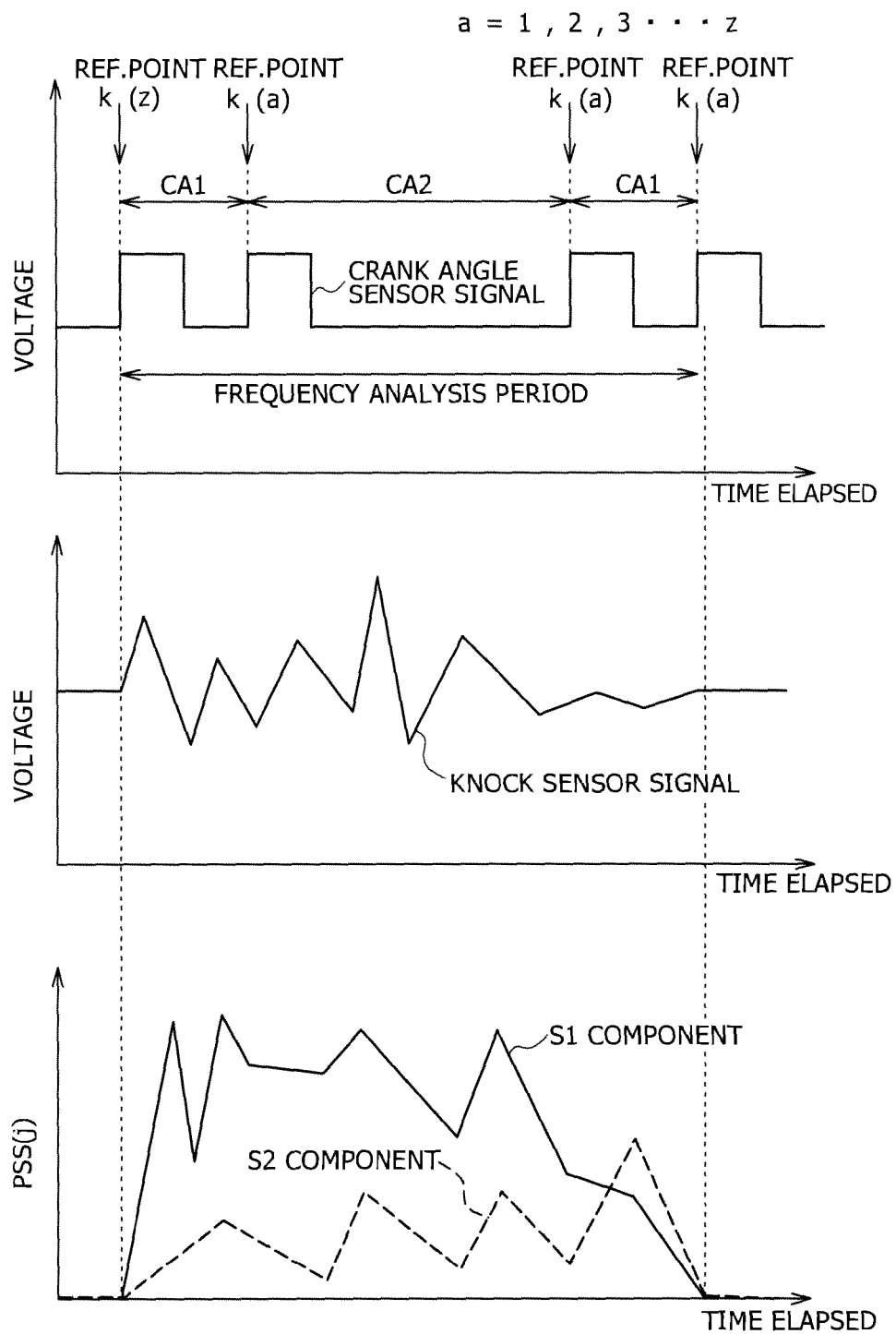
FIG. 7 is a chart diagram representing a period of detection based on output signals of the crank angle sensor depicted in FIG. 1, a period for which vibration of a knock sensor is judged according to the detection period, and vibration energy of specific frequencies.

Then, using FIG. 7, descriptions are provided for frequency analysis processing based on output signals of the knock sensor 9 for the purpose of calculating the magnitude of vibration of the internal combustion engine 100.

In the present embodiment, a signal from the knock sensor 9 is detected in the same way as used for setting a frequency analysis period as described with FIG. 4. A result of frequency analysis performed on five components of given frequency bands which include the center frequencies S1, S2, S3, S4, S5, respectively, obtained from the knock sensor 9 signal during the frequency analysis period is presented as a vibration power spectrum PSS (j) which represents vibration energy. Here, of PSS (j) referring to vibration power spectrum, the letters "PS" denote power spectrum, the letter "S" denotes spark ignited combustion, and (j) is a data number based on clocks (computing cycles) within the ECU 1.

Therefore, this vibration power spectrum PSS (j) is computed for each of the five frequency components, respectively, in given computing cycles over a frequency analysis period (about 60 degrees) and a result of the computation is presented in FIG. 7. That is, the five components of given frequency bands which include the center frequencies S1, S2, S3, S4, S5, respectively, are subjected to frequency analysis computing at a time for the frequency analysis period. By plotting the result of the frequency analysis over the frequency analysis period, a result graph on, e.g., frequency components S1, S2, as seen in FIG. 7, is obtained. Of course, a result graph on other frequency components S3, S4, S5 will be obtained similarly.

Figure 8:
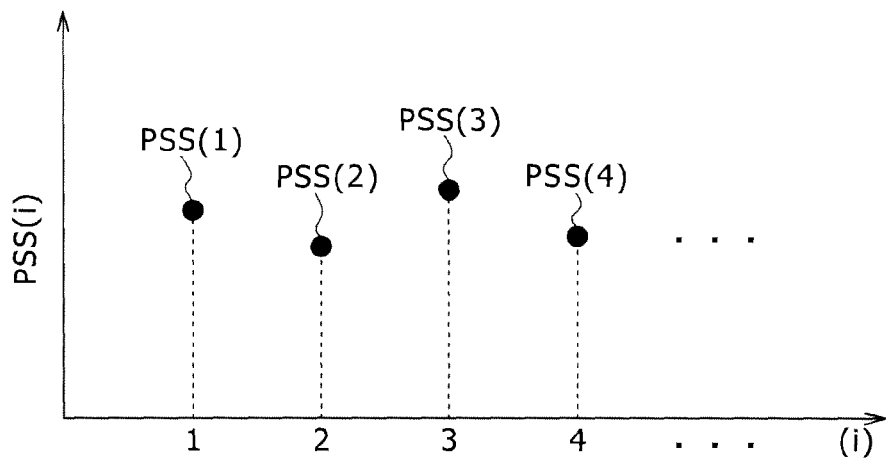
FIG. 8 is a characteristic chart diagram plotting characteristic values per combustion of vibration power spectrum PSS (i) presented in FIG. 7.

Then, using FIG. 8, descriptions are provided about vibration power spectrum PSS (i) characteristics.

FIG. 8 is an explanatory diagram of vibration power spectrum PSS (i). Here, (i) denotes a count of combustion in the internal combustion engine 100. That is, a total sum of vibration power spectrum PSS (i) of a same frequency band for each combustion count is obtained, which is obtained similarly for other frequency bands.

In the present embodiment, vibration power spectrum PSS (i) is calculated from the foregoing vibration power spectrum PSS (j) using the following equation.

$$PSS\ (i) = \int PSS\ (j)\ dj \qquad \text{Equation (1)}$$

* This equation is calculated at the timing of completion of the foregoing frequency analysis period.

Then, predefined computation is performed for vibration power spectrum PSS (i) obtained for each of these frequency bands and combustion noise detection is performed. For example, one detection method obtains a total sum (a combustion noise indicator) by adding all values of vibration power spectrum PSS (i) of the sensed frequency bands or adding a given number of values of PSS (i) in descending order, compares this total sum with a total sum for a case where no knocking occurs (a predetermined referential combustion noise indicator), and determines that knocking occurs if a difference between both indicators is more than or equal to a predetermined value. In addition, there are various methods such as a method for obtaining the combustion noise indicator and the referential combustion noise indicator and a method for comparing the indictors and making a determination. From among them, a method may be selected and performed, as appropriate, in the present embodiment.

Figure 9:
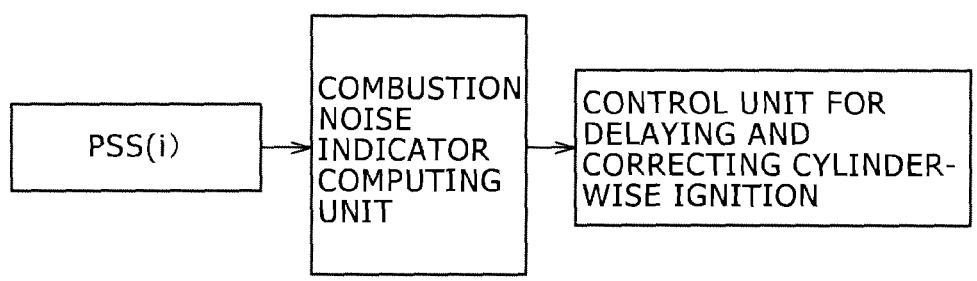
FIG. 9 is a system block diagram of a control section for suppressing combustion noise when the compression ignited combustion FLG is OFF.

FIG. 9 is a block diagram of a control section for suppressing combustion noise when the compression ignited combustion FLG is OFF. This control section includes a combustion noise indicator computing unit that determines whether or not combustion noise is more than a predetermined level of combustion noise based on input signals of vibration power spectrum PSS (i) and a control unit for delaying and correcting cylinder-wise ignition that delays and corrects ignition timing of each cylinder according to an output of the combustion noise indicator computing unit.

Figure 10:
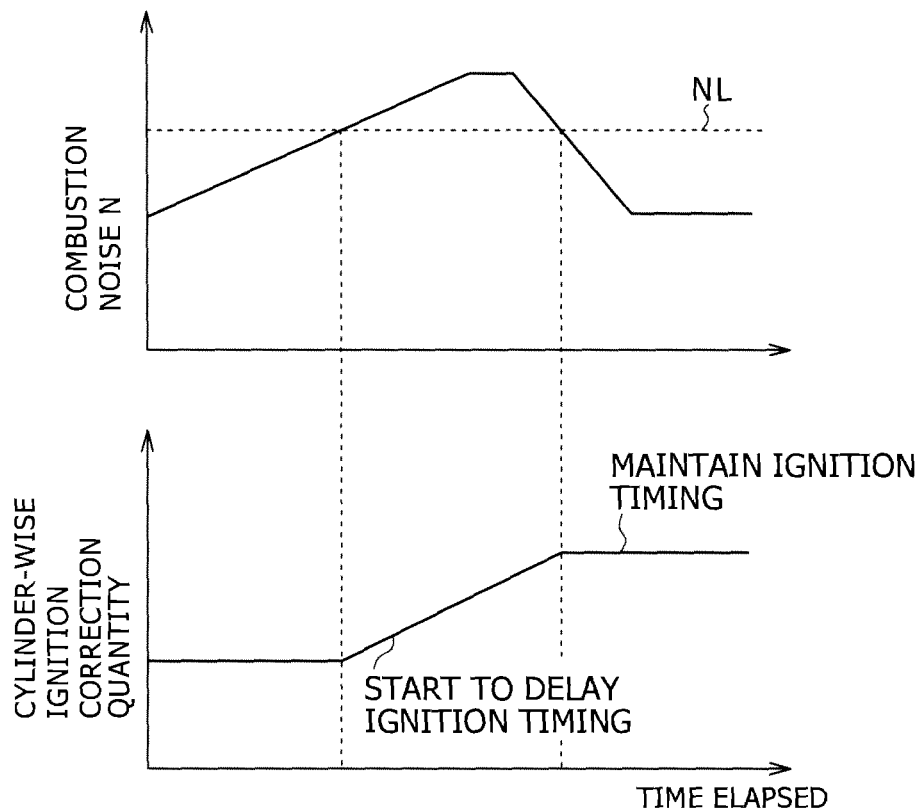
FIG. 10 is a characteristic diagram regarding ignition timing control which is presented in FIG. 9 when the compression ignited combustion FLG is OFF.

FIG. 10 illustrates a process of delaying ignition timing based on a computing result of comparing a combustion noise indicator N with a referential combustion noise indicator NL.

As can be seen from FIGS. 9 and 10, in the present embodiment, when the compression ignited combustion FLG is OFF, based on input signals of vibration power spectrum PSS (i) of the internal combustion engine 100, the combustion noise indicator computing unit computes a combustion noise indicator N and compares this indicator N with a predetermined referential combustion noise indicator NL. When it is determined that combustion noise has become large, the control unit for delaying and correcting cylinder-wise ignition in the following stage gradually delays the ignition timing of a cylinder in which combustion noise has become large at a predetermined rate, so that the combustion noise occurring will be suppressed. Then, by maintaining the cylinder-wise ignition timing when the combustion noise indicator N has become less than the predetermined referential combustion noise indicator NL, the compression noise keeps suppressed.

The reason why combustion noise can be suppressed by the foregoing control is because self-ignition occurs in the combustion chamber in a state when combustion noise is large in spark ignited combustion and it is effective for suppressing this to set ignition timing to suppress self-ignition so that there will not remain a hot spot in the combustion chamber.

The method of delaying and correcting cylinder-wise ignition timing in this control can efficiently reduce hot spots in the combustion chamber and enables suppressing combustion noise steadily by maintaining the delayed and corrected ignition timing. Here, ignition timing can be delayed and corrected because the compression ignited combustion FLG is OFF and the engine runs in the combustion mode of spark ignited combustion. By not only control of ignition timing, combustion noise can be reduced by other aspects of the regulatory mechanism and, therefore, a selection may be made as necessary.

Then, based on FIGS. 11 through 18, descriptions are provided about control for suppressing combustion noise when the compression ignited combustion FLG is ON.

Figure 11:
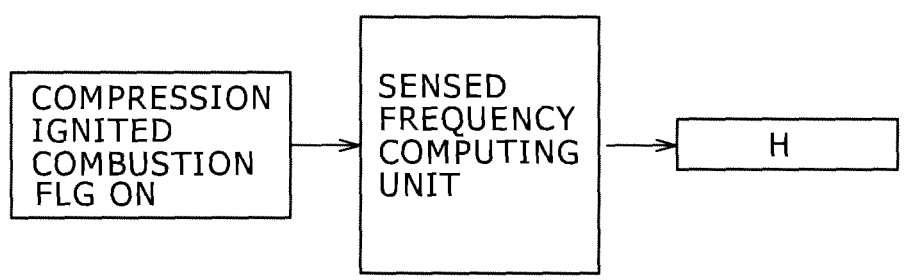

FIG. 11 is a block diagram of a sensed frequency computing unit when the compression ignited combustion FLG is ON. The function and operation of the sensed frequency computing unit are fundamentally the same as those of the corresponding example depicted in FIG. 6. The difference lies in that a frequency band to be detected shifts to a lower frequency band. Accordingly, frequency analysis is performed on a frequency in a lower frequency band.

In the present embodiment, the sensed frequency computing unit is provided that computes vibration energy of a center frequency H as a sensed frequency under the condition that the compression ignited combustion FLG is ON. The center frequency H that is detected when the compression ignited combustion FLG is ON is output as a lower frequency component than five frequency components S1, S2, S3, S4, S5 which are detected in the case of spark ignited combustion, as described with FIG. 6, and a distinct peak is observed at a single frequency.

A sensed frequency band in this case is set to a narrower frequency band than in the case of spark ignited combustion.

More specifically, when knocking occurs in compression ignited combustion, the vibration of the internal combustion engine appears distinctly at a single frequency and frequencies also become low, since the temperature in the combustion chamber 8 is lower than during spark ignited combustion. For the above reason, during compression ignited combustion, by detecting the specific frequency H in a lower frequency band than in the case of spark ignited combustion, it is possible to detect a combustion noise accurately and even improve the accuracy of the detection.

Figure 12:
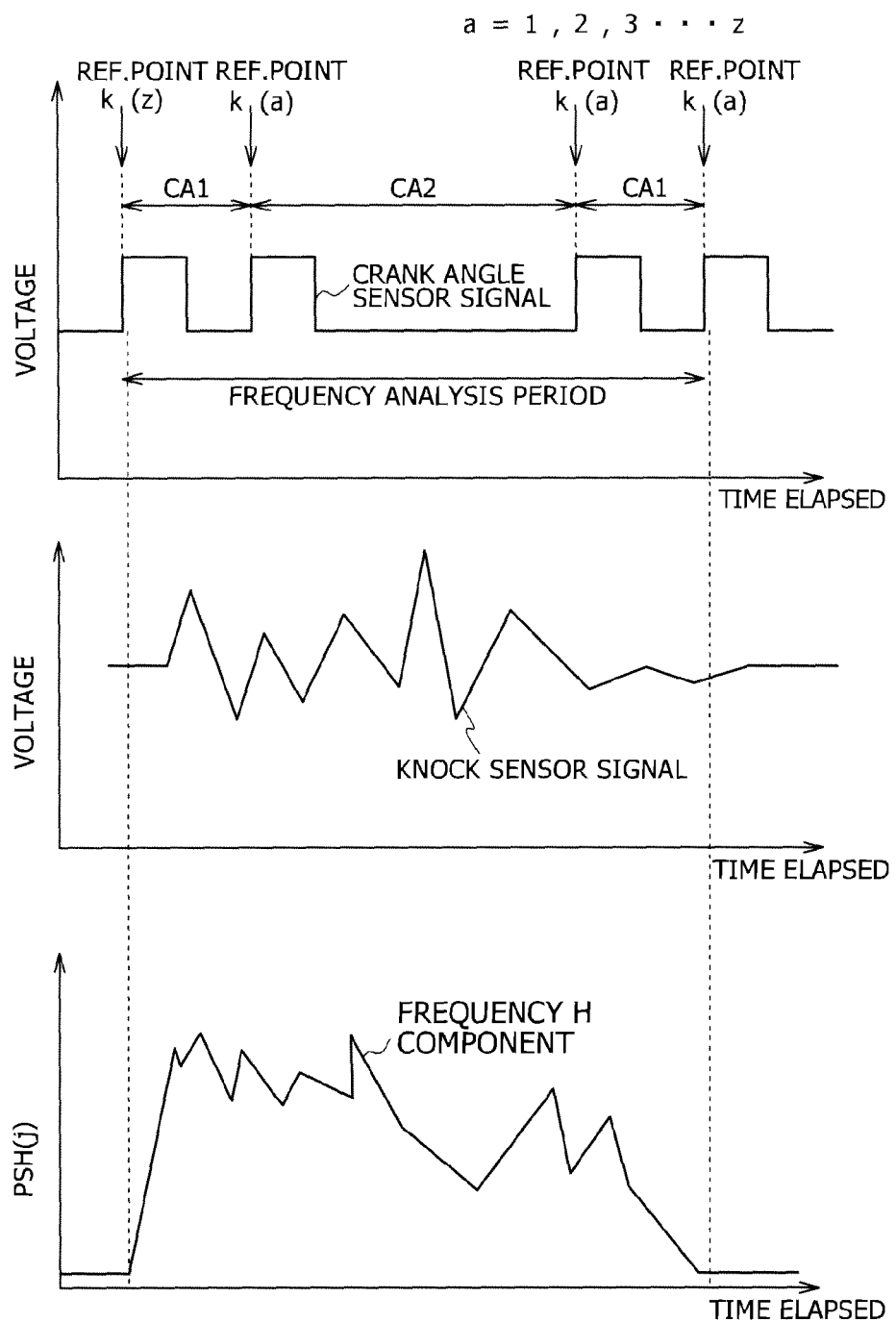
FIG. 12 is a chart diagram representing a period of detection based on output signals of the crank angle sensor depicted in FIG. 1, a period for which vibration of a knock sensor is judged according to the detection period, and vibration energy of a specific frequency.

Then, using FIG. 12, descriptions are provided for frequency analysis processing based on output signals of the knock sensor 9 for the purpose of calculating the magnitude of vibration of the internal combustion engine 100.

As regards FIG. 12 also, fundamentally the same function and operation are performed as for the corresponding example illustrated in FIG. 7. The difference lies in that a sensed frequency shifts to a lower frequency range, as noted above, and frequency analysis on a single frequency is performed. That is, vibration is sampled in a certain sensed frequency band in which a sensed frequency is a center frequency H and frequency analysis is performed.

A result of frequency analysis performed on the sensed frequency H component from the knock sensor signal during the frequency analysis period is presented at the bottom as a graph in which the ordinate plots power spectrum PSH (j) representing the magnitude of vibration energy. Here, of PSH, the letters "PS" denote power spectrum, the letter "H" denotes compression ignited combustion, and (j) is a data number based on clocks (computing cycles) within the ECU 1.

Therefore, this vibration power spectrum PSS (j) is computed in given computing cycles over a frequency analysis period and a result of the computation is presented in FIG. 12. This sensed frequency H is also subjected to frequency analysis computing at a time for the frequency analysis period, as described previously. By plotting the result of the frequency analysis over the frequency analysis period, a result graph, as seen in FIG. 12, is obtained.

Figure 13:
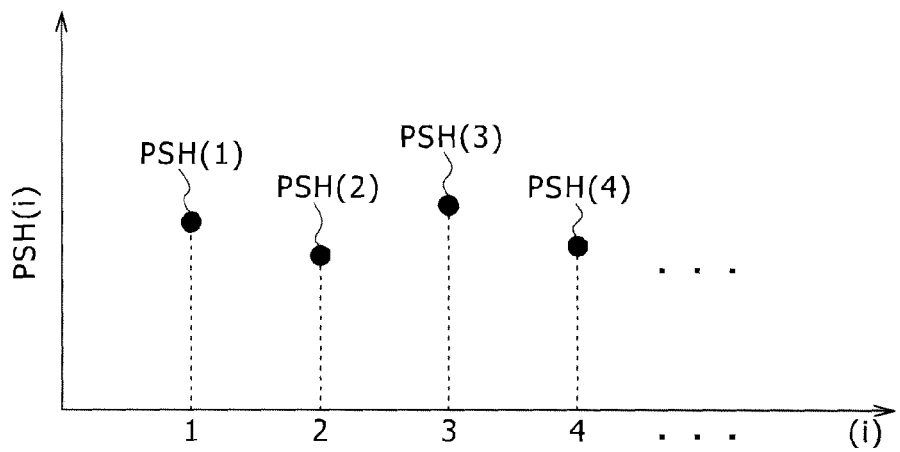
FIG. 13 is a characteristic chart diagram plotting characteristic values per combustion of vibration power spectrum PSS (i) presented in FIG. 12.

Then, using FIG. 13, descriptions are provided about vibration power spectrum PSH (i) characteristics, which are again the same as for the corresponding example illustrated in FIG. 8. PSH (i) is calculated from the vibration power spectrum PSH (j) using the following equation.

$$PSH (i) = \int PSH (j) \, dj \qquad \text{Equation (2)}$$

This equation is calculated at the timing of completion of the frequency analysis period.

Figure 32:
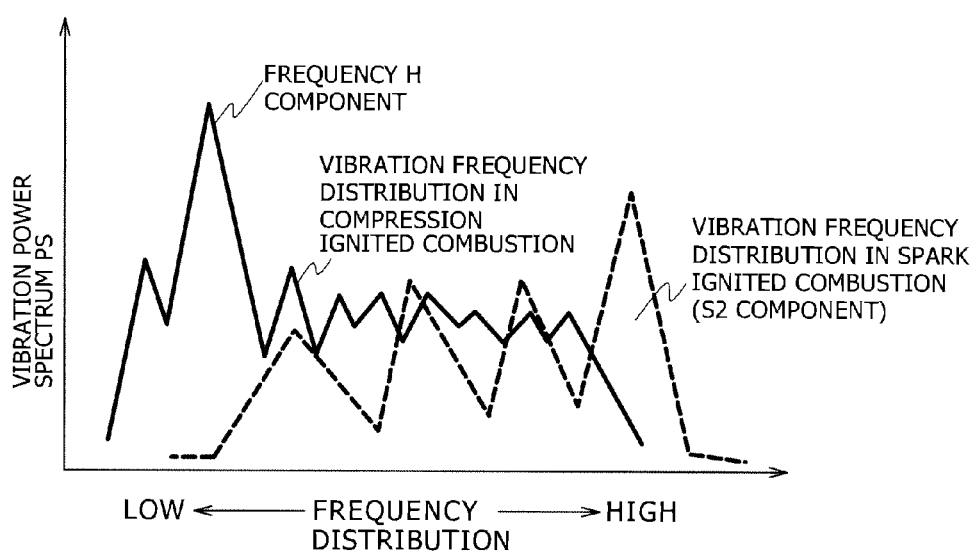
FIG. 32 is a characteristic diagram explaining differing frequency distributions of vibration power spectrum in compression ignited combustion and in spark ignited combustion.

Now, FIG. 32 presents a frequency distribution of vibration power spectrum PSS (i) and vibration power spectrum PSH (i) when knocking has occurred in spark ignited combustion and compression ignited combustion. The power spectrum frequency distribution in the case of compression ignited combustion is indicated by a solid line and that in the case of spark ignited combustion (S2 component) is indicated by a dotted line.

As can be seen from this figure, the frequency specific to knocking in compression ignited combustion appears at a lower frequency range than in spark ignited combustion and this frequency has a single distinct peak, which was observed.

Therefore, frequency analysis can be performed using the respective band filters allowing passage of the respective frequency bands which include the center frequencies S1 to S5, respectively, when the compression ignited combustion FLG is OFF, and using a band filter allowing passage of the frequency band including the center frequency H, when the compression ignited combustion FLG is ON.

Figure 14:
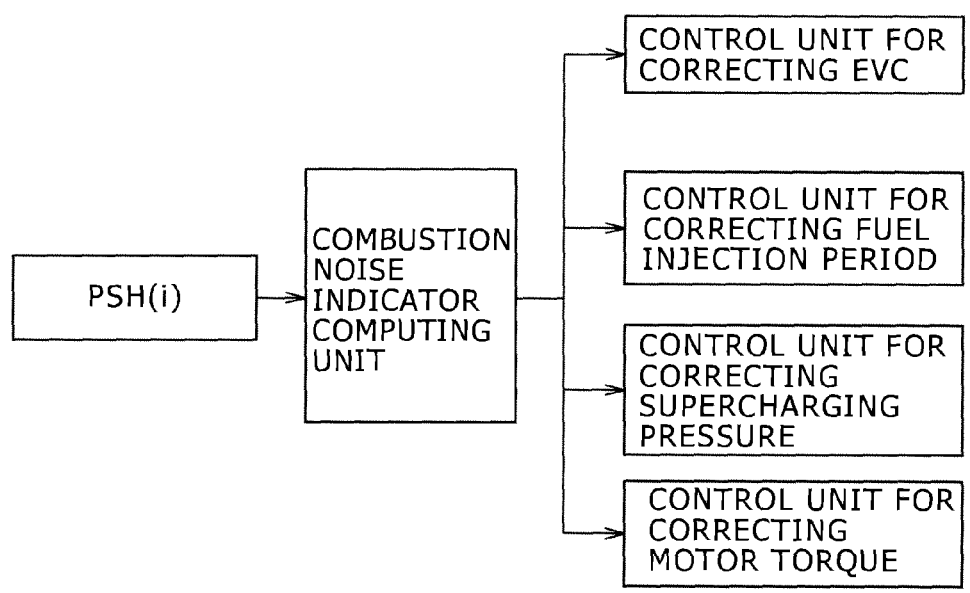

FIG. 14 is a block diagram of a control section for suppressing combustion noise when the compression ignited combustion FLG is ON. Here is provided a noise indicator computing unit for exerting control for correcting any one or more of exhaust valve close timing (EVC), a fuel injection period, supercharging pressure, and the torque of the vehicle driving motor, based on an input signal of vibration power spectrum vibration power spectrum PSH (i).

Figure 15:
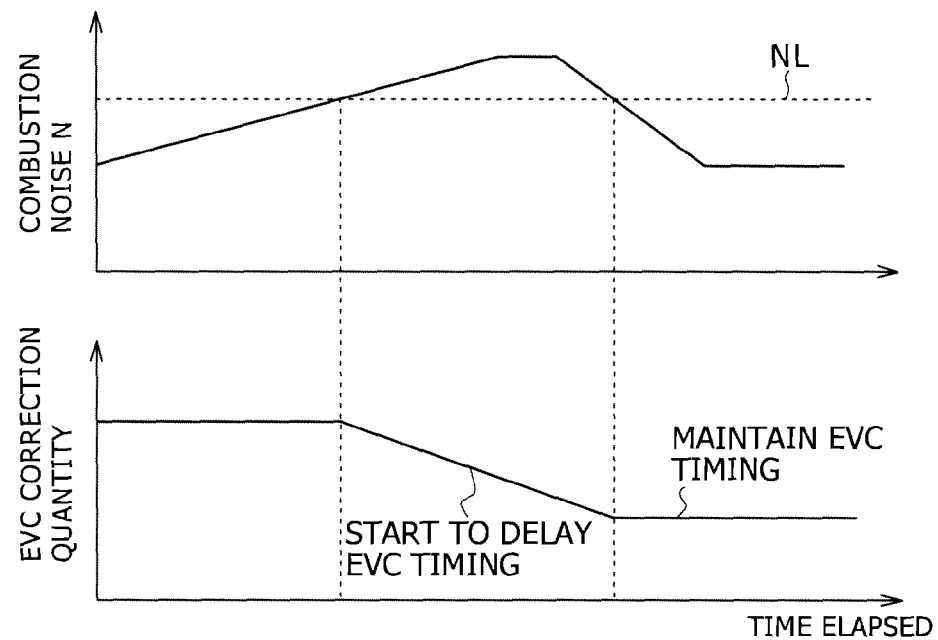

FIG. 15 is a diagram explaining control for correcting exhaust valve closing timing (EVC) in order to suppress combustion noise when the compression ignited combustion FLG is ON.

In the present embodiment, when compression ignited combustion FLG is ON, based on input signals of vibration power spectrum PSH (i), the combustion noise indicator computing unit computes a combustion noise indicator N and compares this indicator N with a predetermined referential combustion noise indicator NL. When it is determined that combustion noise has become large, a control unit for correcting EVC in the following stage gradually delays the closing timing of the exhaust valve of a cylinder in which combustion noise has become large at a predetermined rate, thereby increasing the valve overlap angle, so that the combustion noise occurring will be suppressed. Then, by maintaining the exhaust valve correction quantity when the combustion noise indicator N has become less than the predetermined referential combustion noise indicator NL, the compression noise keeps suppressed.

The reason why combustion noise can be suppressed by the foregoing control is because improper self-ignition timing occurs in a state when combustion noise is large in compression ignited combustion and it is effective for suppressing this to deter hot exhaust gas to promote self-ignition from remaining in the combustion chamber. Delaying and correcting the exhaust valve close timing in this control can efficiently reduce the remaining amount of hot exhaust gas and enable suppressing combustion noise steadily by maintaining the correction quantity.

Figure 16:
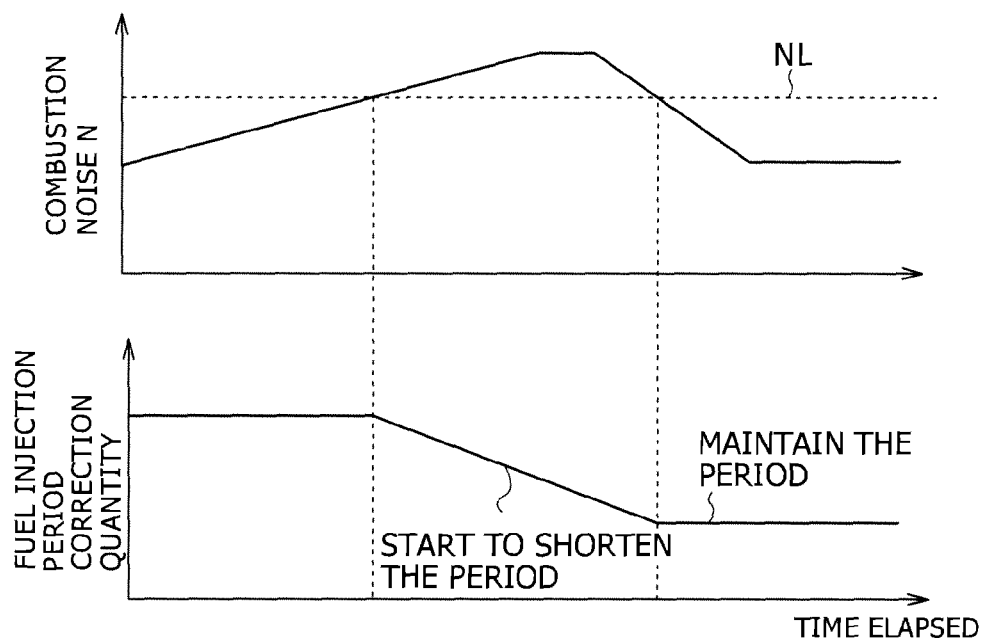

FIG. 16 is a diagram explaining control for correcting the injection period of the injector valve in order to suppress combustion noise when the compression ignited combustion FLG is ON.

In the present embodiment, when the compression ignited combustion FLG is ON, based on input signals of vibration power spectrum PSH (i), the combustion noise indicator computing unit computes a combustion noise indicator N and compares this indicator N with a predetermined referential combustion noise indicator NL. When it is determined that combustion noise has become large, a control unit for correcting fuel injection period in the following stage gradually shortens the fuel injection period of the injector valve of a cylinder in which combustion noise has become large at a predetermined rate, thereby decreasing the fuel injection quantity, so that the combustion noise occurring will be suppressed. Then, by maintaining the fuel injection period correction quantity when the combustion noise indicator N has become less than the predetermined referential combustion noise indicator NL, the compression noise keeps suppressed.

The reason why combustion noise can be suppressed by the foregoing control is because improper self-ignition timing occurs in a state when combustion noise is large in compression ignited combustion and it is effective for suppressing this to deter a radical (OH radical) as a precursor of combustion which promotes self-ignition from remaining in the combustion chamber. Shortening and correcting the fuel injection period in this control can efficiently reduce the remaining amount of the precursor of combustion in the combustion chamber and enable suppressing combustion noise steadily by maintaining the fuel injection period correction quantity.

Figure 17:
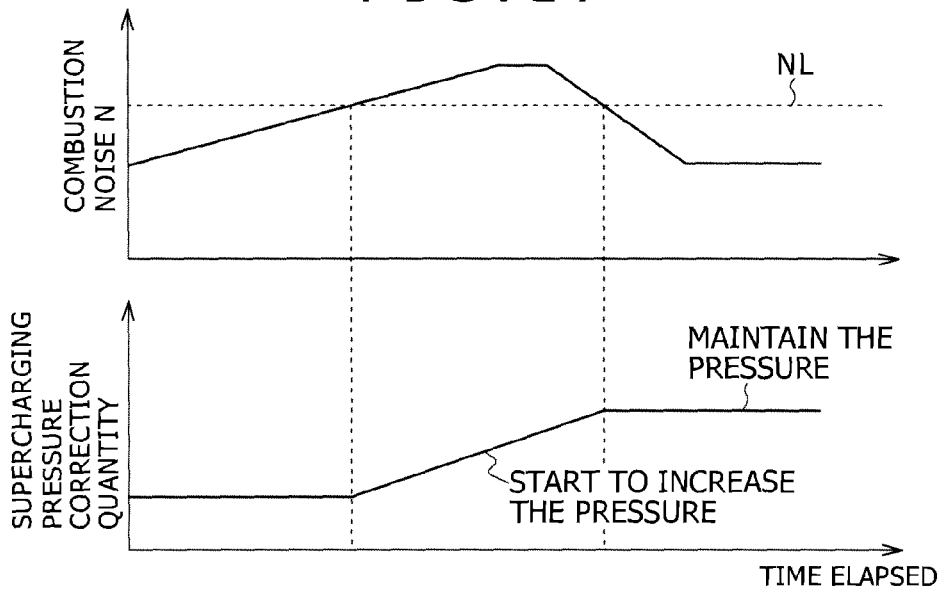

FIG. 17 is a diagram explaining control for correcting the supercharging pressure of a turbocharger which is the supercharger 22 in order to suppress combustion noise when the compression ignited combustion FLG is ON.

In the present embodiment, when the compression ignited combustion FLG is ON, based on input signals of vibration power spectrum PSH (i), the combustion noise indicator computing unit computes a combustion noise indicator N and compares this indicator N with a predetermined referential combustion noise indicator NL. When it is determined that combustion noise has become large, a control unit for correcting supercharging pressure in the following stage controls a waist gate valve of the turbocharger to close and gradually increases supercharging pressure at a predetermined rate to correct it, so that the combustion noise occurring will be suppressed. Then, by maintaining the supercharging pressure correction quantity when the combustion noise indicator N has become less than the predetermined referential combustion noise indicator NL, the compression noise keeps suppressed.

The reason why combustion noise can be suppressed by the foregoing control is because improper self-ignition timing occurs in a state when combustion noise is large in compression ignited combustion and it is effective for suppressing this to deter the fuel concentration to promote self-ignition from becoming dense. Increasing and correcting the supercharging pressure in this control can efficiently decrease the fuel concentration and enable suppressing combustion noise steadily by maintaining the correction quantity.

Figure 18:
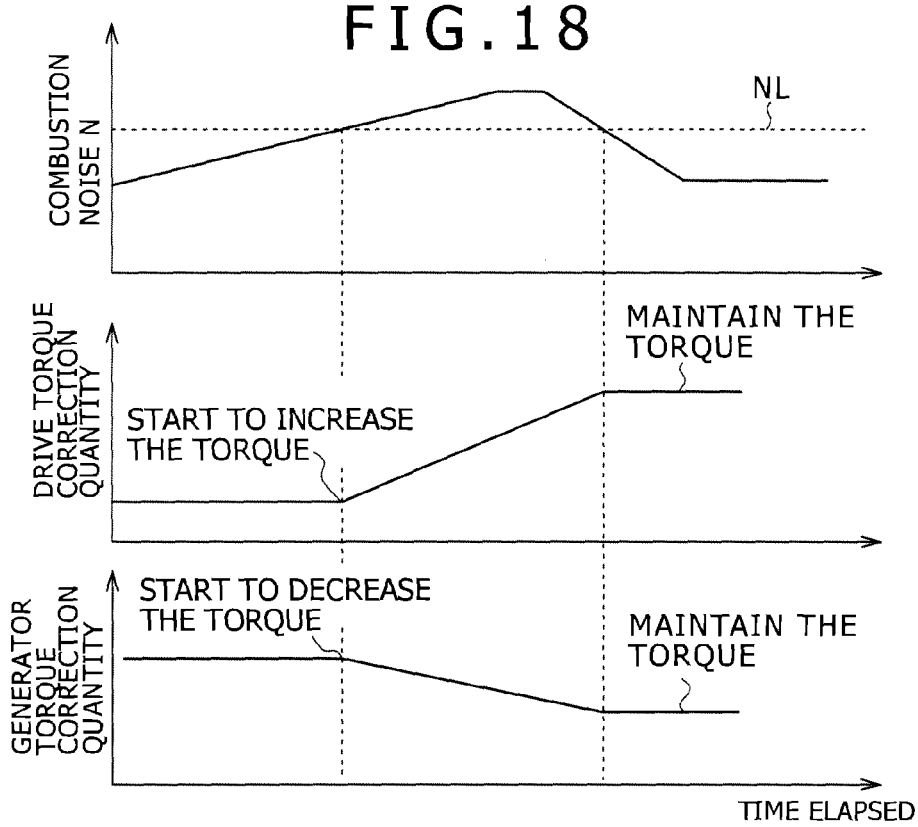

FIG. 18 is a diagram explaining control for correcting the drive torque and generator torque of the vehicle driving motor in order to suppress combustion noise when the compression ignited combustion FLG is ON.

In the present embodiment, when the compression ignited combustion FLG is ON, based on input signals of vibration power spectrum PSH (i), the combustion noise indicator computing unit computes a combustion noise indicator N and compares this indicator N with a predetermined referential combustion noise indicator NL. When it is determined that combustion noise has become large, a control unit for correcting motor torque in the following stage gradually increases the drive torque at a predetermined rate and, conversely, gradually decreases the generator torque at a predetermined rate, so that the combustion noise occurring will be suppressed. Then, by maintaining the correction quantities of the drive torque and the generator torque when the combustion noise indicator N has become less than the predetermined referential combustion noise indicator NL, the compression noise keeps suppressed.

The reason why combustion noise can be suppressed by the foregoing control is because excessive torque occurs in the internal combustion engine 100 in a state when combustion noise is large in compression ignited combustion and it is effective for suppressing this to deter the drive torque of the vehicle driving motor 23 from decreasing and the generator torque of the vehicle driving motor 23 from increasing, as these torques result in excessive torque. Increasing the drive torque and decreasing the generator torque in this control can efficiently decrease the excessive torque and enable suppressing combustion noise steadily by maintaining the correction quantities.

Figure 19:
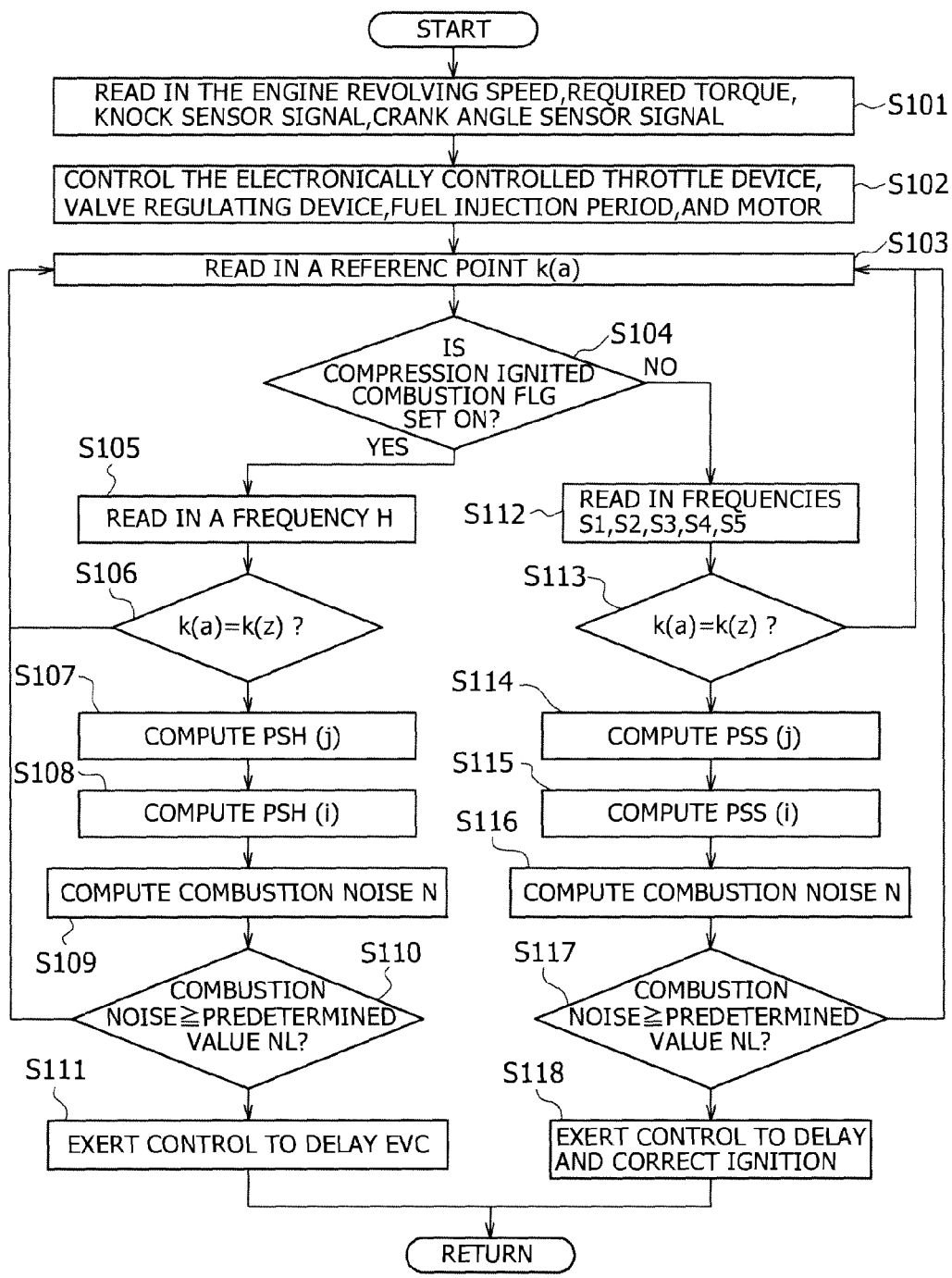
FIG. 19 is a flowchart illustrating control details in the control device depicted in FIG. 1.

FIG. 19 is a flowchart for explaining the foregoing controls for suppressing combustion noise in a more concrete manner. An ignition device including the ignition plug 14 and the valve regulating devices 7 are used as components of the regulatory mechanism and ignition timing and valve close timing are controlled as operating parameters.

The flowchart in FIG. 19 is executed repeatedly at predetermined intervals or by an interrupt signal that is generated cyclically at each given rotation angle of the engine.

Within the ECU 1, at step 101 (step is hereinafter denoted as "S"), information relevant to the current operating region of the internal combustion engine (such as the internal combustion engine revolving speed, required torque, knock sensor signal, crank angle sensor signal, etc.) is read in. The required torque is computed based on output signals of the accelerator position sensor 2.

Then, at S102, the electronically controlled throttle device 16, valve regulating devices 7, injector valve 13, and motor 23 are controlled so that proper operation can be implemented based on the current operating region of the internal combustion engine.

Then, at S103, the ECU 1 reads in a reference point k (a), using the crank angle sensor signal which has been read at S101.

Then, at S104, using the internal combustion engine revolving speed, required torque, etc. which have been read at S101, the ECU discerns a combustion mode by judging whether the current operating region is a compression ignited combustion region or a spark ignited combustion region from the control map or the like, as presented in FIG. 5, and sets the compression ignited combustion FLG ON or OFF.

First, if the compression ignited combustion FLG is set ON, the ECU reads in a sensed frequency H at S105 and, at S106 that follows, the ECU determines whether the reference point k (a) read at S103 is equal to k (z). If not, returning to S103, the ECU reads in a reference point k (a) again. If the reference point k (a) read at S103 is equal to k (z), the ECU computes vibration power spectrum PSH (j) of a frequency component corresponding to the sensed frequency H at S107.

Then, at S108, the ECU computes vibration power spectrum PSH (i) by integrating PSH (j) until the completion timing of a frequency analysis calculation period. In turn, at S109, the ECU computes a combustion noise indicator N of the vibration power spectrum PSH (i) of each frequency computed at S108. This combustion noise indicator N is an arithmetic average value or the like of the vibration power spectrum PSH (i) in the case of the present embodiment.

Then, at S110, the ECU determines whether or not the combustion noise indicator N is more than or equal to a predetermined referential combustion noise indicator NL. If not, returning to S103, the ECU reads in a reference point k (a) again. If it has been determined that the combustion noise indicator N is more than or equal to the predetermined referential combustion noise indicator NL, the ECU exerts control to delay the exhaust valve close timing (EVC) as illustrated in FIG. 15 at S111 and terminates this control process.

If the compression ignited combustion FLG is set OFF, the ECU reads in sensed frequencies S1, S2, S3, S4, and S5 at S112. Then, at S113, the ECU determines whether the reference point k (a) read at S103 is equal to k (z). If not, returning to S103, the ECU reads in a reference point k (a) again.

If the reference point k (a) read at S103 is equal to k (z), the ECU computes vibration power spectrum PSS (j) of frequency components corresponding to the sensed frequencies S1, S2, S3, S4, S5 at S114.

Then, at S115, the ECU computes vibration power spectrum PSS (i) by integrating the vibration power spectrum PSS (j) of the five components S1 to S5 until the completion timing of a frequency analysis calculation period. In turn, at S116, the ECU computes a noise indicator N of the vibration power spectrum PSS (i) computed at S115. This noise indicator N is an arithmetic average value or the like of the vibration power spectrum PSS (i) in the case of the present embodiment.

Then, at S117, the ECU determines whether or not the combustion noise indicator N is more than or equal to the predetermined referential combustion noise indicator NL. If not, returning to S103, the ECU reads in a reference point k (a) again.

If it has been determined that the noise indicator N is more than or equal to the predetermined value NL, the ECU exerts control to delay the ignition timing as illustrated in FIG. 10 at S118 and terminates this control process.

Second Embodiment

Next, a second embodiment of the present invention is described using FIGS. 21 through 24. As for component parts that are fundamentally the same as those of the first embodiment depicted in FIGS. 1 and 2, their descriptions are omitted.

The difference from the embodiment depicted in FIGS. 1 and 2 lies in that the second embodiment is arranged such that both a resonant knock sensor and a non-resonant knock sensor are used and a combustion noise is detected using these two knock sensors.

Figure 20:
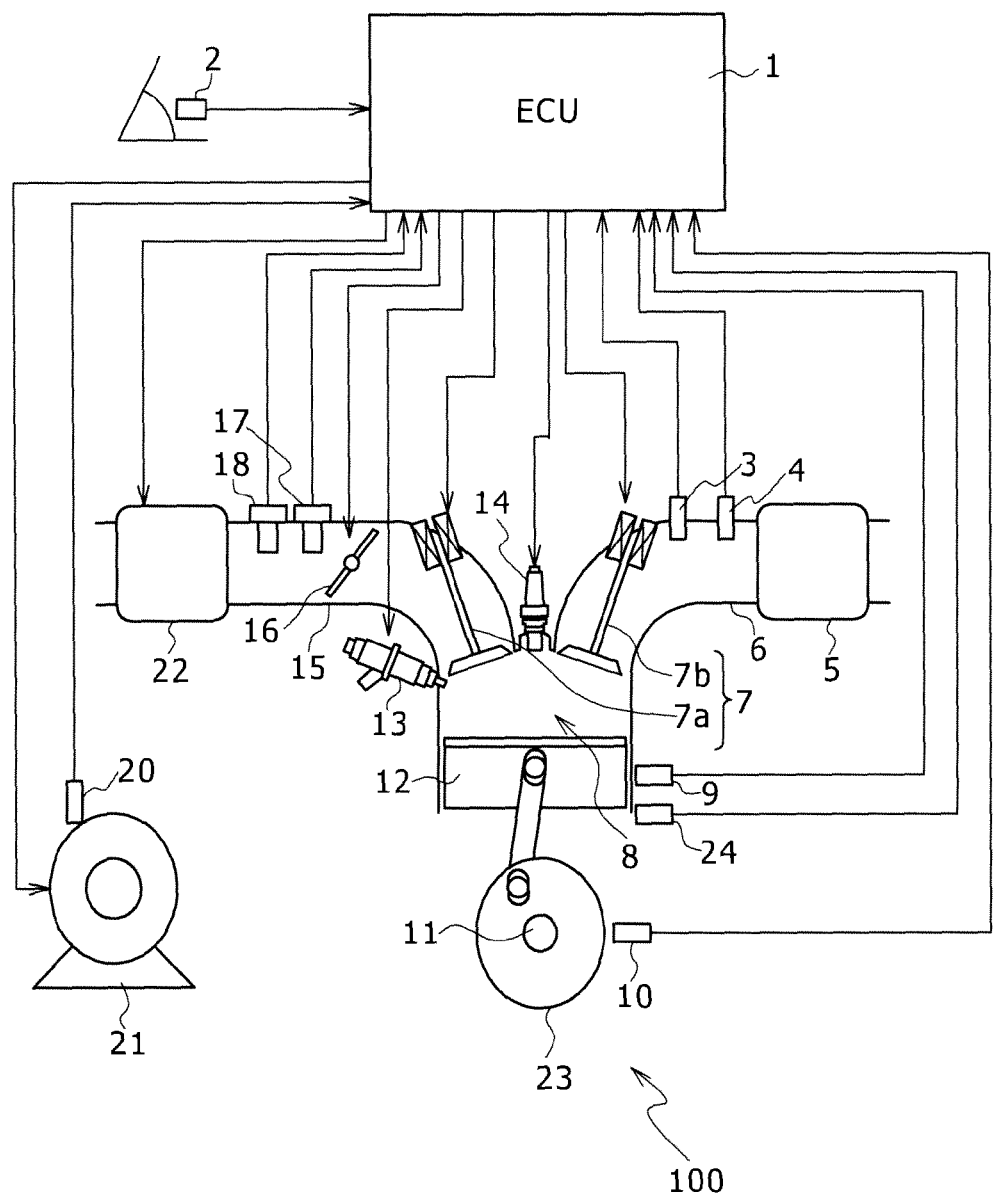
FIG. 20 is a structural diagram depicting a structure of a device for controlling an internal combustion engine, as another embodiment of the present invention.
Figure 21:
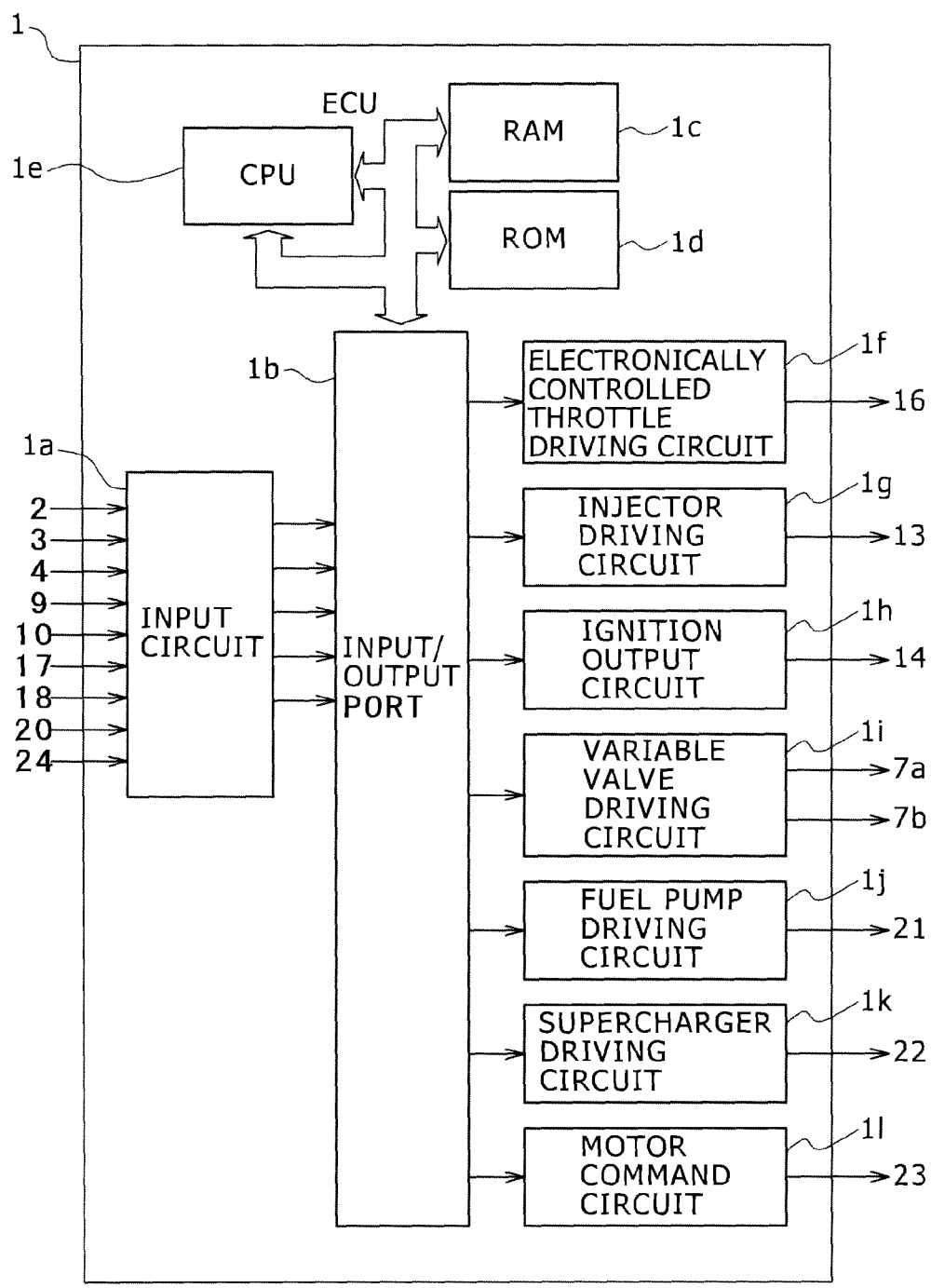
FIG. 21 is a block diagram depicting an internal structure of an ECU depicted in FIG. 20.

In FIG. 20, a non-resonant knock sensor 9 and a resonant knock sensor 24 are attached to the cylinder block and signals from these sensors are input to an input circuit 1a as present in FIG. 21.

Figure 22:
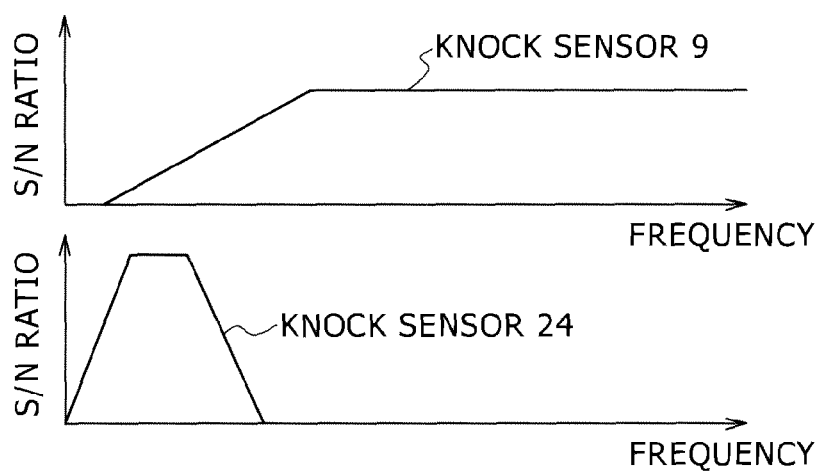
FIG. 22 is a characteristic diagram plotting S/N ratio as the sensitivity indicators of two knock sensors depicted in FIG. 20

Then, using FIG. 22, descriptions are provided about knock sensor characteristics of the non-resonant knock sensor 9 and the resonant knock sensor 24. In particular, a graph of S/N ratio as a sensitivity indicator is presented, in which the abscissa plots frequency and the ordinate plots S/N ratio.

As can be seen in FIG. 22, the knock sensor 9 has a characteristic in which the S/N ratio is almost flat over frequencies, whereas the knock sensor 24 has a characteristic in which the S/N ratio is high for specific frequencies in a lower frequency range.

Now, since a combustion noise occurring in compression ignited combustion has a distinct peak in a low frequency band, sensed frequencies of the knock sensor 24 are set lower than those of the knock sensor 9, so that a combustion noise occurring in compression ignited combustion will be detected by the resonant knock sensor 24.

Figure 23:
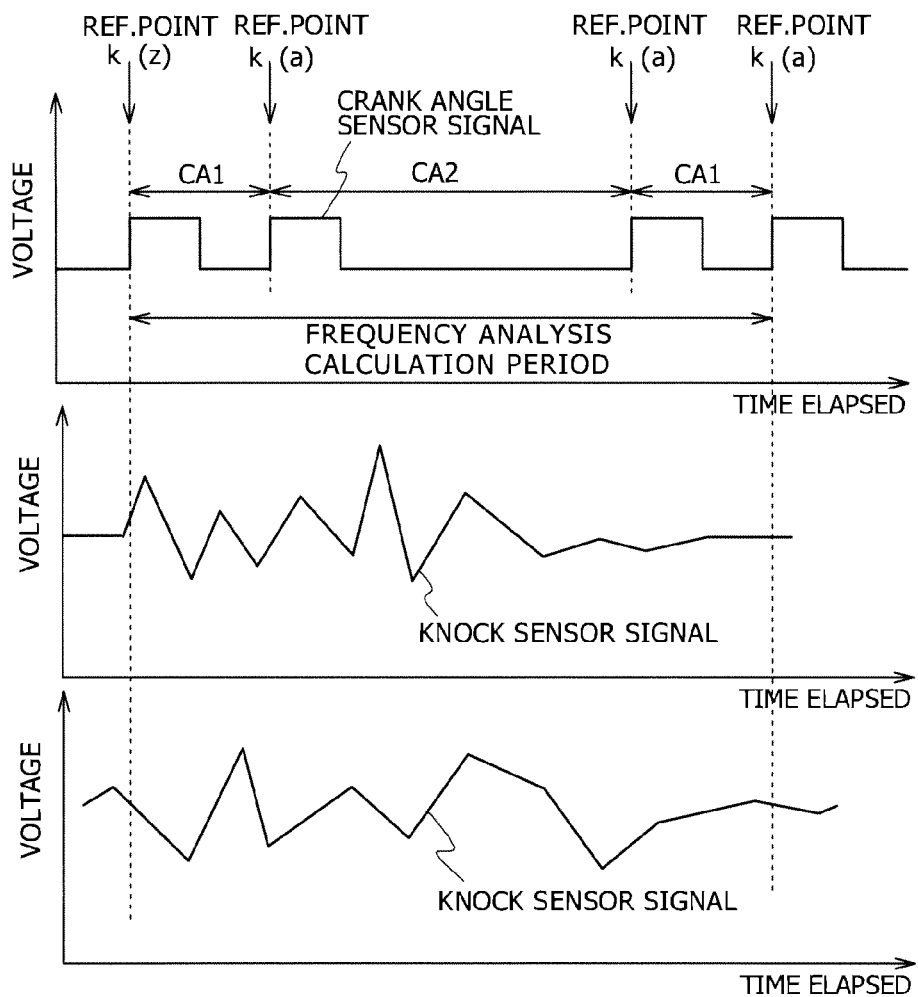
FIG. 23 is a chart diagram representing a period of detection based on output signals of a crank angle sensor depicted in FIG. 20 and a period for which vibration of the two knock sensors is judged according to the detection period.

Then, using FIG. 23, descriptions are provided for frequency analysis processing based on output signals of the knock sensor 9 for the purpose of calculating the magnitude of vibration of the internal combustion engine 100.

As regards FIG. 23 also, fundamentally the same function and operation are performed as for the corresponding example illustrated in FIG. 7. The difference lies in that frequency analysis is performed for the sensed frequencies of both the resonant knock sensor 24 and the non resonant knock sensor 9.

Signals from the knock sensor 9 and the knock sensor 24 are input to the ECU 1 during a frequency analysis calculation period. Since the knock sensor 9 and the knock sensor 24 have specific sensitivities in terms of S/N ratio to different frequency ranges, these sensors show different values of sensed signals.

Figure 24:
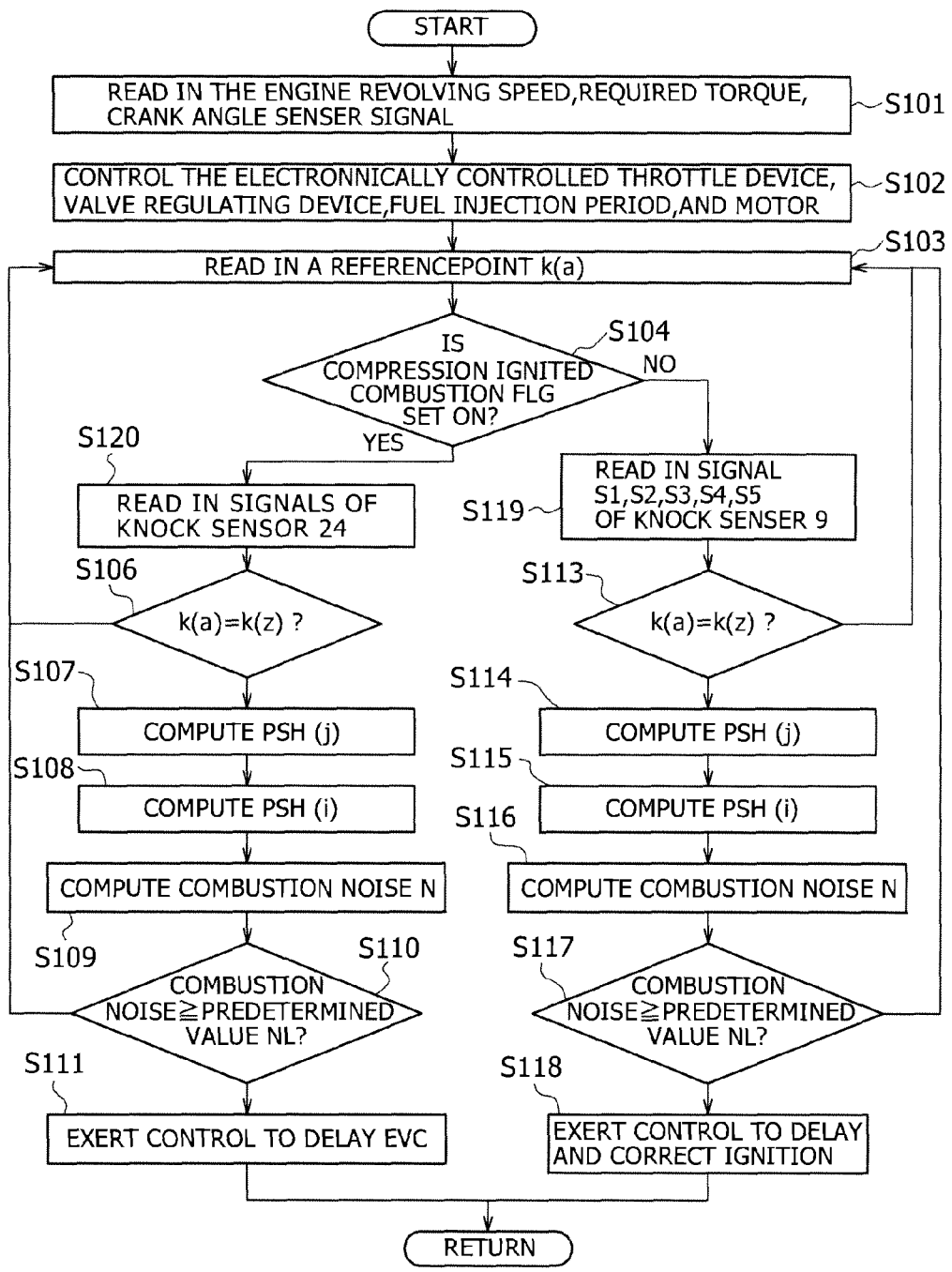
FIG. 24 is a flowchart illustrating control details in the control device depicted in FIG. 20.

FIG. 24 is a flowchart for explaining the controls for suppressing combustion noise in a more concrete manner in a case in which the two knock sensors are used. The ignition device 14 including the ignition plug and the valve regulating devices 7 are used as components of the regulatory mechanism and ignition timing and valve close timing are controlled as operating parameters.

The flowchart in FIG. 24 is executed repeatedly at predetermined intervals or by an interrupt signal that is generated cyclically at each given rotation angle of the engine.

A process that is substantially the same as the process illustrated in FIG. 19 is performed. The difference from the corresponding example illustrated in FIG. 19 lies in processing after the decision step S104 in which the ECU judges whether or not the operating region is a compression ignited combustion region and sets the compression ignited combustion FLG ON or OFF.

If it is determined at S104 that the current operating region is not compression ignited combustion, the process goes to S119 in which the ECU selects the signals of the knock sensor 9 because of the spark ignited combustion mode. The ECU gets the frequency components of the sensed frequencies S1 to S5 and executes frequency analysis computing. A subsequent process flow is the same as the process flow in FIG. 19 and, therefore, its description is omitted.

If it is determined at S104 that the current operating region is compression ignited combustion, the process goes to S120 in which the ECU selects the signals of the knock sensor 24. The ECU gets a resonant frequency component of the knock sensor 24 and executes frequency analysis computing. A subsequent process flow is the same as the process flow in FIG. 19 and, therefore, its description is omitted. In this way, because the resonant knock sensor 24 is used to detect a combustion noise during compression ignited combustion, it is possible to make accurate combustion noise detection during compression ignited combustion. Accordingly, it can be expected that combustion control can be implemented with high accuracy.

Third Embodiment

Next, a third embodiment of the present invention is described using FIGS. 25 through 31. As for component parts that are fundamentally the same as those of the first embodiment depicted in FIGS. 1 and 2, their descriptions are omitted.

Figure 25:
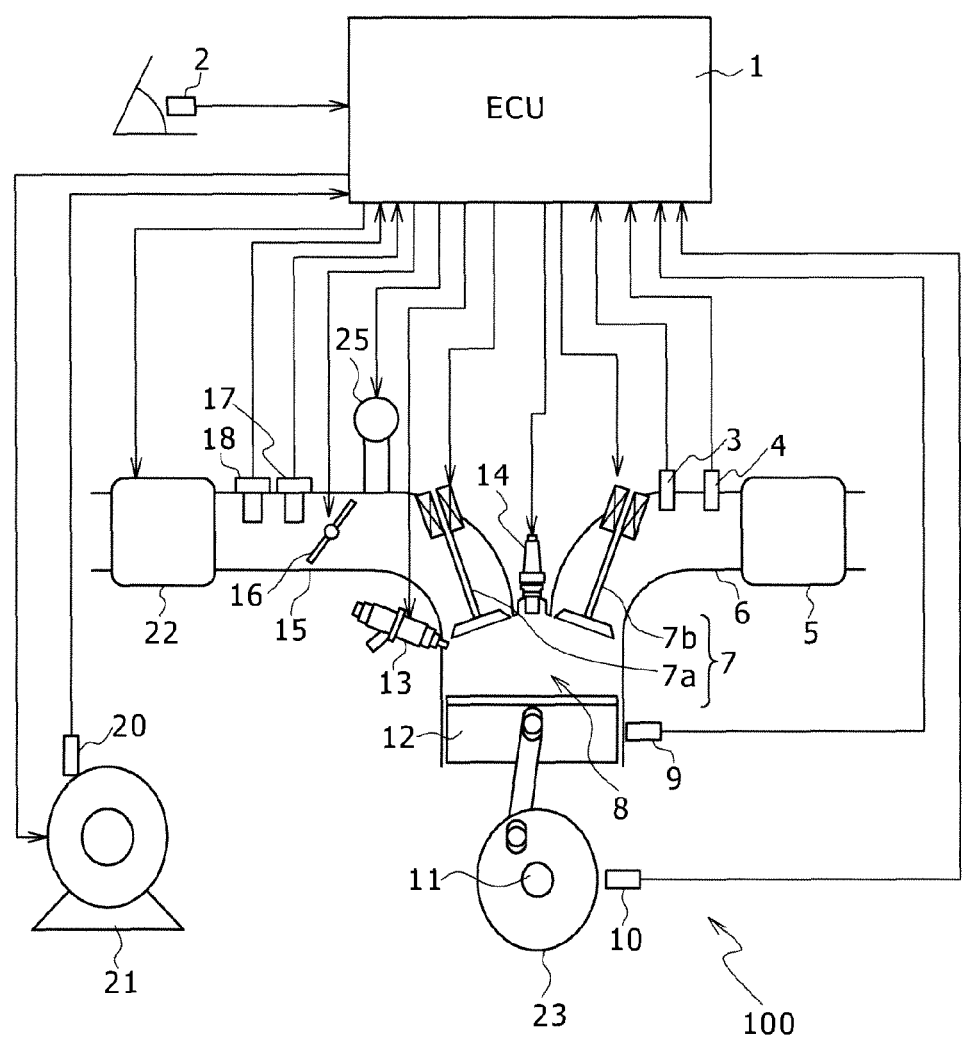
FIG. 25 is a structural diagram depicting a structure of a device for controlling an internal combustion engine, as yet another embodiment of the present invention.

The system structure in FIG. 25 is substantially the same as the embodiment depicted in FIGS. 1 and 2. The difference lies in that more combustion modes are applied instead of the two regions of spark ignited combustion and compression ignited combustion; i.e., the operating scope is divided into four combustion regions: (1) stoichiometric (theoretical air-fuel ratio) spark ignited combustion; (2) lean combustion; (3) exhaust gas recirculation combustion; and (4) compression ignited combustion, and combustion control is exerted on these regions. Thus, the control map within the ECU 1 is created in accordance with this. In the present embodiment:

(1) Stoichiometric spark ignited combustion is a combustion mode in which air-fuel mixture having a theoretical air-fuel ratio is ignited by the ignition plug and combusted;
(2) Lean combustion is a combustion mode in which air-fuel mixture containing more air than the theoretical air-fuel ratio is ignited by the ignition plug and combusted;
(3) Exhaust gas recirculation combustion is a combustion mode in which air-fuel mixture having a theoretical air-fuel ratio into which exhaust gas has been recirculated (including internal EGR/external EGR) is ignited by the ignition plug and combusted; and
(4) Compression ignited combustion is a combustion mode in which air-fuel mixture having a theoretical air-fuel ratio is adiabatically compressed by a piston, thus causing self-ignition and combustion.

Again, these combustion modes are examples and it goes without saying that additional combustion modes in which compression ignition replaced ignition by the ignition plug may be adopted, including, for example, a combustion mode in which air-fuel mixture containing more air than the theoretical air-fuel ratio, as mentioned in (2) above, is adiabatically compressed by a piston, thus causing ignition and combustion; and a combustion mode in which air-fuel mixture having a theoretical air-fuel ratio into which exhaust gas has been recirculated, as mentioned in (3) above, is adiabatically compressed by a piston, thus causing ignition and combustion.

Moreover, combustion control may be exerted on various combustion modes in which the foregoing forms of air-fuel mixture are combined with compression ignition and spark ignition.

As will be described later, among the respective combustion modes, a distinct frequency at which a combustion noise appears as a peak is lowest in compression ignited combustion; this frequency is higher in lean combustion, even higher in exhaust gas recirculation combustion, and highest in stoichiometric spark ignited combustion. The reason for this is considered to be due to the fact that the combustion temperature differs from one combustion mode to another and this causes a change in the pressure propagation velocity of combustion gas.

Figure 26:
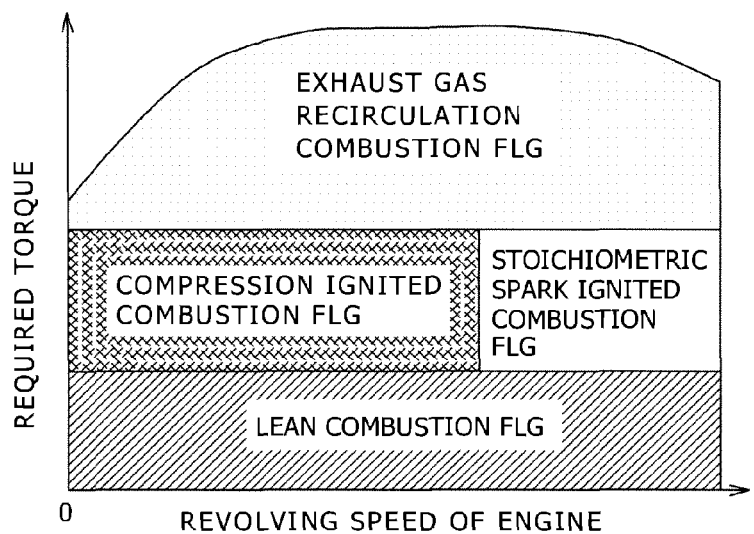
FIG. 26 is a diagram of a control map representing the operating regions of stoichiometric spark ignited combustion, lean combustion, exhaust gas recirculation combustion, and compression ignited combustion, in which the control map is provided in the control device depicted in FIG. 25.

FIG. 26 is an explanatory diagram of a control map, presenting the combustion regions and combustion mode flag (FLG) states of (1) stoichiometric spark ignited combustion, (2) lean combustion, (3) exhaust gas recirculation combustion, and compression ignited combustion.

In the present embodiment, according to the operating regions, combustion mode switching takes place among (1) stoichiometric spark ignited combustion, (2) lean combustion, (3) exhaust gas recirculation combustion, and (4) compression ignited combustion.

The ECU 1 is provided with the control map to control the combustion mode FLGs, based on the required torque which is computed from the output signals of the accelerator position sensor 2 and the revolving speed of the internal combustion engine 100 which is computed from the output signals of the crank angle sensor 10. The ECU 1 sets one of the combustion mode FLGs ON, based on the required torque and the internal combustion engine revolving speed.

In FIG. 25, provided is the control map to control the FLGs of stoichiometric spark ignited combustion, lean combustion, exhaust gas recirculation combustion, and compression ignited combustion. However, this is non-liming and the control map may include two or more of the respective combustion modes.

Figure 27:
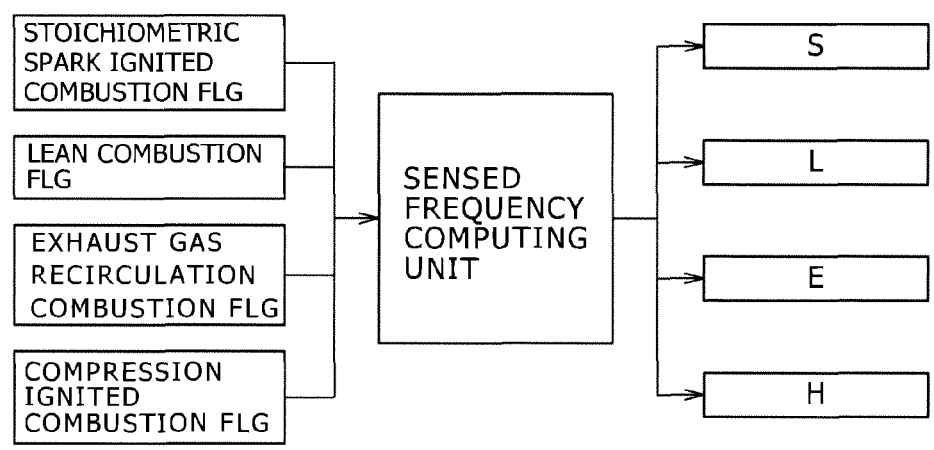
FIG. 27 is a block diagram of a sensed frequency computing unit in the embodiment depicted in FIG. 25.

FIG. 27 is a block diagram of a sensed frequency computing unit that analyses sensed frequencies in a combustion mode selected by the map presented in FIG. 26. Here is provided the sensed frequency computing unit that outputs the vibration power spectrum PS of a sensed frequency S during (1) stoichiometric spark ignited combustion, a sensed frequency L during (2) lean combustion, a sensed frequency E during (3) exhaust gas recirculation combustion, and a sensed frequency H during (4) compression ignited combustion, depending on which combustion mode FLG is set on.

Thus, this unit outputs the vibration power spectrum PSS of the sensed frequency S when the stoichiometric spark ignited combustion FLG is ON, the vibration power spectrum PSL of the sensed frequency L when the lean combustion FLG is ON, the vibration power spectrum PSE of the sensed frequency E when exhaust gas recirculation combustion FLG is ON, and the vibration power spectrum PSH of the sensed frequency H when the compression ignited combustion FLG is ON.

These spectra can be computed by the same method as in the first embodiment. Because the non-resonant knock sensor 9 is used, a selection of a frequency band is made by using a band filter for the frequency band in order to select a sensed frequency that is specific to a combustion mode.

Here, it is newly observed that the sensed frequencies have a relation: H<L<E<S. The reason for this is due to the fact that the combustion temperature differs from one another among the respective combustion modes and this causes a change in the pressure propagation velocity of combustion gas. Thus, because there is a sensed frequency suitable for detecting a combustion noise in each combustion mode, frequency analysis processing that is performed on such frequency enables accurate combustion noise evaluation.

Independently of selection of a sensed frequency by a combustion mode FLG, the vibration power spectra PS may be computed for all the sensed frequencies S, L, E, and H. Resonant sensors that resonate with the frequencies S, L, E, and H, respectively, may be used, a selection may be made among these sensors depending on combustion mode, and a combustion noise may be detected.

Figure 28:
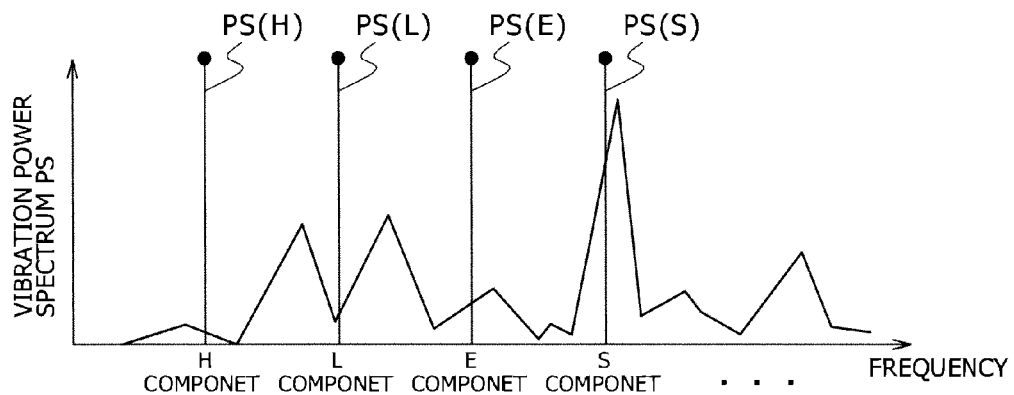
FIG. 28 is a characteristic diagram plotting distribution of the frequencies specific to each combustion mode.

Then, using FIG. 28, descriptions are provided about frequency analysis processing based on the output signals of the knock sensor 9.

In the present embodiment, the vibration power spectrum for each frequency is computed by frequency analysis processing on vibration signals from the knock sensor 9. The abscissa plots frequency and the ordinate plots vibration power spectrum PS which represents vibration energy.

Within the ECU 1, the vibration power spectra PS of the sensed frequencies S, L, E, and H computed for signals obtained by the frequency analysis processing are read in. It is here preferable to set the sensed frequencies as follows: H<L<E<S. Thereby, it is possible to respond to frequency change due to combustion temperature change depending on each combustion mode and the accuracy of the detection can be improved.

From the result of read-in of the vibration power spectra PS computed for the sensed frequencies S, L, E, and H independently of the combustion mode FLGs, it is possible to discern a combustion mode from a sensed frequency of which the vibration power spectrum PS is the largest among the vibration power spectra PSS, PSL, PSE, and PSH of these sensed frequencies. For example, if the vibration power spectrum PSH is the largest, the combustion mode is compression ignited combustion.

Now, with regard to the controls for modifying the combustion condition, since the vibration power spectrum value specific to each combustion mode differs from one combustion mode to another, a predetermined referential combustion noise indicator NL with which a combustion noise indicator N computed from the vibration power spectrum is compared should be set to be specific to each combustion mode. For example, for each combustion mode, a background vibration power spectrum PS (BGL) when knocking does not occur may be computed and a referential combustion noise indicator NL may be derived from such spectrum.

Figure 29:
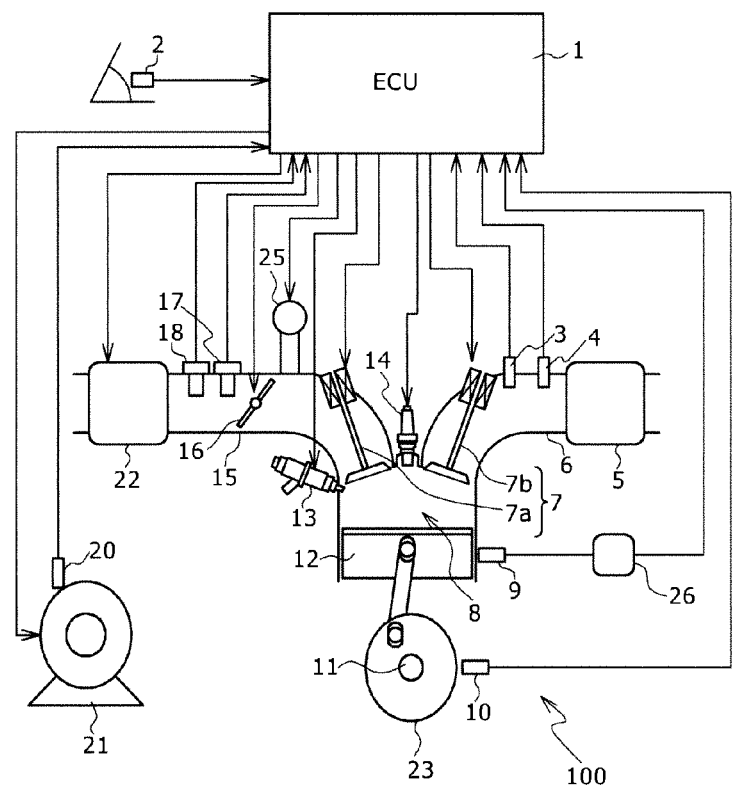
FIG. 29 is a structural diagram depicting a structure of a device for controlling an internal combustion engine, as a further embodiment of the present invention.

Then, using FIG. 29, descriptions are provided about a method of changing a sensed frequency. A feature hereof is that a filter circuit 26 is provided in a signal line between the knock sensor 9 and the knock sensor 9. The filter circuit 26 is configured such that its filtering function can be switched ON and OFF arbitrarily.

Although there are various filtering functions and methods, functions such as low-pass, high-pass, and band-pass may be used singly or in combination according to the sensed frequencies.

Figure 30:
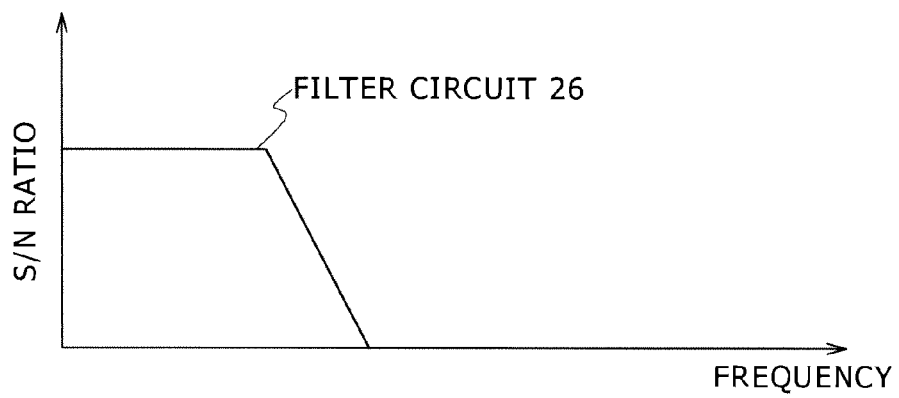
FIG. 30 is a characteristic diagram of a filter circuit depicted in FIG. 29.

FIG. 30 is a characteristic diagram of the filter circuit 26. This filter circuit 26 has a characteristic of filtering signals with frequencies higher than a given frequency. The given frequency should be an intermediate frequency among the sensed frequencies S, L, E, and H mentioned previously. This filter circuit 26 has a low-pass filter characteristic and can filter signals with frequencies higher than the given frequency from the knock sensor 9. Filtering timing is commanded by a switching signal from the ECU 1. For this filtering operation, digital filtering can also be performed by software within the ECU 1.

It can also be judged whether sensed frequency change was performed by way of the method of changing a sensed frequency according to FIG. 29. A method hereof is described.

Figure 31:
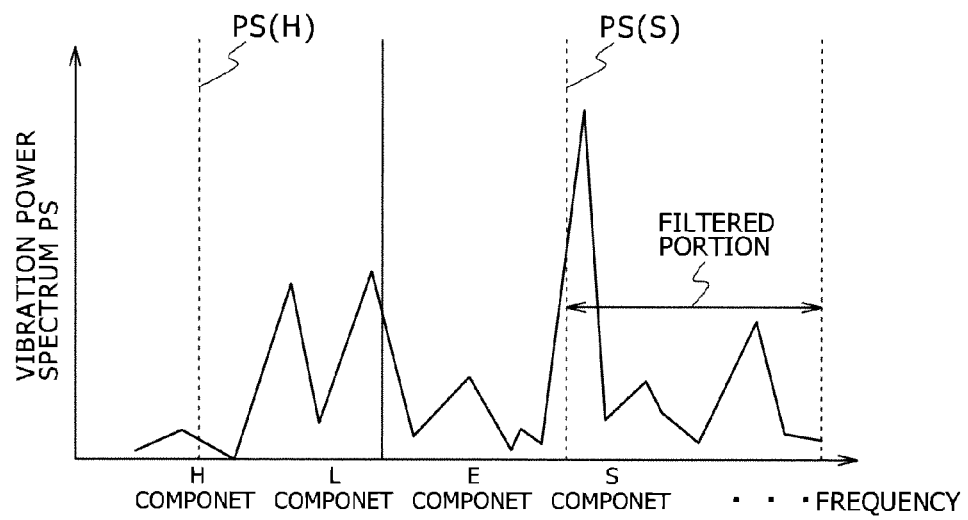
FIG. 31 is a characteristic diagram of a knock sensor signal when the filter circuit depicted in FIG. 29 is applied.

FIG. 31 presents a knock sensor 9 signal characteristic when the filter circuit 26 is applied. Signals from the knock sensor 9 are filtered according to the foregoing filter circuit characteristic. For example, the ignition timing is altered by switching the filtering of the filter circuit 26 ON and OFF when the stoichiometric spark ignited combustion is performed. By switching the filtering of the filter circuit 26 ON and OFF when compression ignited combustion is performed and making sure that both the valve regulating devices and the fuel injection period remain the same, it can be judged that sensed frequency change is performed according to the stoichiometric spark ignited combustion mode.

While the embodiments described hereinbefore make use of a vibration sensing type knock sensor to detect vibration of the internal combustion engine caused by combustion, as a sensor for detecting a combustion noise, it is possible to use other sensors such as an ion current sensor that measures electrical conductivity of combustion gas in the combustion chamber and an intra-cylinder pressure sensor that measures combustion pressure in the combustion chamber. As for signals sensed by these sensors, the behavior of frequency distribution regarding combustion noise exhibits the same tendency for different combustion modes.

With the finding that there is a distinct sensed frequency or frequency band that is identifiable (or having a conspicuous value), specific to each combustion mode, the present invention principally suggests that a combustion noise occurrence can be detected with accuracy by selectively detecting such a frequency or frequency band according to each combustion mode. By controlling combustion condition in the combustion chamber using this detection method, rigorous control can be conducted and, in consequence, it can be expected to improve fuel efficiency performance and emission performance.

LIST OF REFERENCE SIGNS

1 . . . ECU, 2 . . . Accelerator position sensor, 3 . . . Exhaust air temperature sensor, 4 . . . Air-fuel ratio sensor, 5 . . . Three-way catalyst, 6 . . . Exhaust pipe 6, 7a . . . Intake valve regulating device, 7b . . . Exhaust vale regulating device, 8 . . . Combustion chamber, 9 . . . Knock sensor, 10 . . . Crank angle sensor, 11 . . . Crankshaft, 12 . . . Piston, 13 . . . Injector valve, 14 . . . Ignition plug, 15 . . . Intake pipe, 16 . . . Electronically controlled throttle device, 17 . . . Intake air temperature sensor, 18 . . . Air flow sensor, 20 . . . Fuel pressure sensor, 21 . . . Fuel pump, 22 . . . Supercharger, 23 . . . Motor, 24 . . . Knock sensor, 25 . . . EGR valve, 26 . . . Filter circuit, 100 . . . Internal combustion engine, 20a . . . Input circuit, 20b . . . Input/output port, 20c . . . RAM, 20d . . . ROM, 20e . . . CPU, 20f . . . Electronically controlled throttle driving circuit, 20g . . . Injector valve driving circuit, 20h . . . Ignition output circuit, 20i . . . Variable valve driving circuit, 20j . . . Fuel pump driving circuit, 20k . . . Supercharger driving circuit

The invention claimed is:

1. A method for controlling an internal combustion engine, comprising detecting a combustion noise in the internal combustion engine for use in a control device that computes a comparative magnitude of a combustion noise by frequency analysis processing on a frequency signal from a combustion noise sensor that detects a combustion noise in a combustion chamber of the internal combustion engine as a frequency output, the method characterized in that the control device (1) identifies a combustion mode taking place in the combustion chamber, which is set depending on running condition, the combustion mode being set to a mode corresponding to one of spark ignited combustion in which air-fuel mixture is ignited by an ignition plug and compression ignited combustion in which air-fuel mixture or air is compressed by a piston, thus causing self-ignition, and selects a proper sensed frequency of the combustion noise sensor for the combustion mode; and (2) computes a comparative magnitude of a combustion noise specific to the combustion mode taking place in the combustion chamber by frequency analysis processing on the selected sensed frequency output; and further comprising controlling combustion by a regulatory means so that an actual combustion noise becomes less than a predetermined value of combustion noise when the computed comparative magnitude of a combustion noise is more than the predetermined value.

2. The method for controlling an internal combustion engine according to claim 1, characterized in that a sensed frequency of the combustion noise sensor for the compression ignited combustion is set to a lower value than a sensed frequency of the combustion noise sensor for the spark ignited combustion.

3. A method for controlling an internal combustion engine, comprising detecting a combustion noise in the internal combustion engine for use in a control device that computes a comparative magnitude of vibration by frequency analysis processing on a frequency signal from a non-resonant knock sensor that detects vibration caused by combustion in a combustion chamber of the internal combustion engine as a frequency output, the method characterized in that the control device (1) identifies a combustion mode taking place in the combustion chamber, the combustion mode being set to a mode corresponding to one of spark ignited combustion in which air-fuel mixture is ignited by an ignition plug and compression ignited combustion in which air-fuel mixture or air is compressed by a piston, thus causing self-ignition, which is set depending on running condition, and selects a proper sensed frequency of the knock sensor for the combustion mode; and (2) computes a comparative magnitude of vibration specific to the combustion mode taking place in the combustion chamber by frequency analysis processing on the selected sensed frequency output; and further comprising controlling combustion by a regulatory means so that an actual vibration becomes less than a predetermined value of vibration when the computed comparative magnitude of vibration is more than the predetermined value.

4. The method for controlling an internal combustion engine according to claim 3, characterized in that a sensed frequency of the knock sensor for the compression ignited combustion is set to a lower value than a sensed frequency of the knock sensor for the spark ignited combustion.

5. The method for controlling an internal combustion engine according to claim 4, characterized in that a sensed frequency band of the knock sensor for the spark ignited combustion is set to a band including sensed frequencies having at least two or more distinct peaks and a sensed frequency band of the knock sensor for the compression ignited combustion is set to a band including a sensed frequency having a single distinct peak.

6. The method for controlling an internal combustion engine according to claim 4, characterized in that sensed frequency bands of the knock sensor for the spark ignited combustion are set to two or more bands respectively including center frequencies having at least two or more distinct peaks and a sensed frequency band of the knock sensor for the compression ignited combustion is set to a band including a center frequency having a single distinct peak.

7. The method for controlling an internal combustion engine according to claim 1, characterized in that the combustion mode taking place in the combustion chamber, which is set depending on running condition, is one of the following modes: compression ignited combustion, lean combustion, exhaust gas recirculation combustion, and stoichiometric spark ignited combustion, and a sensed frequency among these modes is lowest in compression ignited combustion, higher in lean combustion, even higher in exhaust gas recirculation combustion, and highest in stoichiometric spark ignited combustion.

8. A device for controlling an internal combustion engine, the device computing a comparative magnitude of a combustion noise by frequency analysis processing on a frequency signal from a combustion noise sensor that detects a combustion noise in a combustion chamber of the internal combustion engine as a frequency output, the device characterized by comprising:

a combustion mode identifying means that identifies a combustion mode taking place in the combustion chamber, the combustion mode being set to a mode corresponding to one of spark ignited combustion in which air-fuel mixture is ignited by an ignition plug and compression ignited combustion in which air-fuel mixture or air is compressed by a piston, thus causing self-ignition, which is set depending on running condition;

a frequency selecting means that selects a sensed frequency of the combustion noise sensor, which has been predetermined to be specific to a combustion mode identified; and a combustion noise computing unit that computes a comparative magnitude of a combustion noise specific to the combustion mode taking place in the combustion chamber by frequency analysis processing on the selected sensed frequency output; and a regulating means that, if an output of the combustion noise computing unit is more than a predetermined value of combustion noise, controls combustion so that an actual combustion noise becomes less than the predetermined value of combustion noise by action of the regulatory mechanism.

9. The device for controlling an internal combustion engine according to claim 8, characterized in that the frequency selecting means selects a sensed frequency predetermined for the spark ignited combustion if the spark ignited combustion is identified and selects a sensed frequency predetermined for the compression ignited combustion, which is lower than the sensed frequency for the spark ignited combustion, if the compression ignited combustion is identified.

10. A device for controlling an internal combustion engine, the device computing a comparative magnitude of vibration by frequency analysis processing on a frequency signal from a non-resonant knock sensor that detects vibration caused by combustion in a combustion chamber of the internal combustion engine as a frequency output, the device characterized by comprising:

a combustion mode identifying means that identifies a combustion mode taking place in the combustion chamber, the combustion mode being set to a mode corresponding to one of spark ignited combustion in which air-fuel mixture is ignited by an ignition plug and compression ignited combustion in which air-fuel mixture or air is compressed by a piston, thus causing self-ignition, which is set depending on running condition;

a frequency selecting means that selects a sensed frequency of the knock sensor, which has been predetermined to be specific to a combustion mode identified; and a combustion noise computing unit that computes a comparative magnitude of vibration specific to the combustion mode taking place in the combustion chamber by frequency analysis processing on the selected sensed frequency output; and a regulating means that controls combustion so that an actual vibration becomes less than a predetermined value of vibration when the computed comparative magnitude of vibration is more than the predetermined value.

11. The device for controlling an internal combustion engine according to claim 10, characterized in that the frequency selecting means selects a sensed frequency predetermined for the spark ignited combustion if the spark ignited combustion is identified and selects a sensed frequency predetermined for the compression ignited combustion, which is lower than the sensed frequency for the spark ignited combustion, if the compression ignited combustion is identified.

12. The device for controlling an internal combustion engine according to claim 10, characterized in that the frequency selecting means selects a frequency band including sensed frequencies having at least two or more distinct peaks if the spark ignited combustion is identified and selects a frequency band including a sensed frequency having a single distinct peak if the compression ignited combustion is identified.

13. The device for controlling an internal combustion engine according to claim 10, characterized in that the frequency selecting means selects two or more frequency bands respectively including center frequencies having at least two or more distinct peaks if the spark ignited combustion is identified and selects a frequency band including a center frequency having a single distinct peak if the compression ignited combustion is identified.

14. The device for controlling an internal combustion engine according to claim 8, characterized in that the combustion mode taking place in the combustion chamber, which is set depending on running condition, is one of the following modes: compression ignited combustion, lean combustion, exhaust gas recirculation combustion, and stoichiometric spark ignited combustion, and a sensed frequency among these modes is lowest in compression ignited combustion, higher in lean combustion, even higher in exhaust gas recirculation combustion, and highest in stoichiometric spark ignited combustion.

15. A device for controlling an internal combustion engine, the device computing a comparative magnitude of vibration by frequency analysis processing on a frequency signal from a knock sensor that detects vibration caused by combustion in a combustion chamber of the internal combustion engine as a frequency output, the device characterized by comprising:

a combustion mode identifying means that identifies a combustion mode taking place in the combustion chamber, the combustion mode being set to a mode corresponding to one of spark ignited combustion in which air-fuel mixture is ignited by an ignition plug and compression ignited combustion in which air-fuel mixture or air is compressed by a piston, thus causing self-ignition, which is set depending on running condition;

a frequency selecting means that selects either a frequency signal from a resonant knock sensor or a frequency signal from a non-resonant knock sensor according to a combustion mode identified; and a combustion noise computing unit that computes a comparative magnitude of vibration specific to the combustion mode taking place in the combustion chamber by frequency analysis processing on the selected sensed frequency outputs; and a regulating means that controls combustion so that an actual vibration becomes less than a predetermined value of vibration when the computed comparative magnitude of vibration is more than the predetermined value.

16. The device for controlling an internal combustion engine according to claim 15, characterized in that the frequency selecting means selects a frequency signal from the non-resonant knock sensor if the spark ignited combustion is identified and selects a frequency signal from the resonant knock sensor if the compression ignited combustion is identified.

17. A device for controlling an internal combustion engine, wherein the device comprises a combustion noise detecting unit that computes a comparative magnitude of a combustion noise by frequency analysis processing on a frequency signal from a combustion noise sensor that detects a combustion noise in a combustion chamber of the internal combustion engine that is run in a combustion mode which is set depending on running condition as a frequency output and drives a regulatory mechanism that controls combustion in the internal combustion engine according to an output of the combustion noise detecting unit, the device characterized by comprising:

a combustion mode identifying means that identifies a combustion mode which is set depending on the running condition, the combustion mode being set to a mode corresponding to one of spark ignited combustion in which air-fuel mixture is ignited by an ignition plug and compression ignited combustion in which air-fuel mixture or air is compressed by apiston, thus causing self-ignition;

a frequency selecting means that selects a sensed frequency of the combustion noise sensor, which has been predetermined to be specific to a combustion mode identified;

a combustion noise computing unit that computes a comparative magnitude of a combustion noise specific to the combustion mode taking place in the combustion chamber by frequency analysis processing on the selected sensed frequency output; and a regulating means that, if an output of the combustion noise computing unit is more than a predetermined value of combustion noise, controls combustion so that an actual combustion noise becomes less than the predetermined value of combustion noise by action of the regulatory mechanism.

18. A device for controlling an internal combustion engine, wherein the device comprises a combustion noise detecting unit that computes a comparative magnitude of vibration by frequency analysis processing on a frequency signal from a knock sensor that detects vibration caused by combustion in a combustion chamber of the internal combustion engine that is run in a combustion mode which is set depending on running condition as a frequency output and drives a regulatory mechanism that controls combustion in the internal combustion engine according to an output of the combustion noise detecting unit, the device characterized by comprising:
- a combustion mode identifying means that identifies the combustion mode, which is either of at least spark ignited combustion in which air-fuel mixture is ignited by an ignition plug and compression ignited combustion in which air-fuel mixture or air is compressed by a piston, thus causing self-ignition;
- a frequency selecting means that selects a sensed frequency predetermined for the spark ignited combustion if the spark ignited combustion is identified and selects a sensed frequency predetermined for the compression ignited combustion, which is lower than the sensed frequency for the spark ignited combustion, if the compression ignited combustion is identified;
- a combustion noise computing unit that computes a comparative magnitude of a combustion noise specific to the combustion mode taking place in the combustion chamber by frequency analysis processing on the selected sensed frequency output; and
- an ignition correction means that, when it is determined that the mode is the spark ignited combustion by the combustion mode identifying means, and if an output of the combustion noise computing unit is more than a predetermined value of combustion noise, delays ignition timing so that an actual combustion noise becomes less than the predetermined value of combustion noise by action of an ignition device which is one component of the regulatory mechanism; and
- a means for correction by the regulatory mechanism, wherein the means, when it is determined that the mode is the compression ignited combustion by the combustion mode identifying means, and if an output of the combustion noise computing unit is more than a predetermined value of combustion noise, controls combustion so that an actual combustion noise becomes less than the predetermined value of combustion noise by using one of at least the following: valve regulating devices that control the open/close timing and open/close lift of an intake valve and an exhaust valve of the internal combustion engine; an injector valve that controls the injection timing and period of fuel which is fed into the internal combustion engine; a supercharger that controls supercharging pressure of air which is fed into the internal combustion engine; and a vehicle driving motor that increases or decreases the drive torque or generator torque in a hybrid car action of another component of the regulatory mechanism than the ignition device, which are other components of the regulatory mechanism than the ignition device.

19. The device for controlling an internal combustion engine according to claim 18, characterized in that the means for correction by the regulatory mechanism performs at least one of the following controls:
- (1) if an output of the combustion noise computing unit is more than a predetermined value of combustion noise, delaying the exhaust valve close timing by the valve regulating devices and maintaining the close timing when the output of the combustion noise computing unit has become less than the predetermined value of combustion noise;
- (2) if an output of the combustion noise computing unit is more than a predetermined value of combustion noise, shortening the injector valve open period and maintaining the open period when the output of the combustion noise computing unit has become less than the predetermined value of combustion noise;
- (3) if an output of the combustion noise computing unit is more than a predetermined value of combustion noise, increasing supercharging pressure of the supercharger and maintaining the supercharging pressure when the output of the combustion noise computing unit has become less than the predetermined value of combustion noise; and
- (4) if an output of the combustion noise computing unit is more than a predetermined value of combustion noise, increasing the drive torque of the vehicle driving motor and decreasing the generator torque and maintaining the drive torque and the generator torque when the output of the combustion noise computing unit has become less than the predetermined value of combustion noise.

* * * * *